(12) United States Patent
Sanderson

(10) Patent No.: US 6,802,239 B1
(45) Date of Patent: Oct. 12, 2004

(54) SPONSON TOW PLATE-MOUNTED HELICOPTER ARMAMENT APPARATUS AND ASSOCIATED METHODS

(76) Inventor: Paul H. Sanderson, 2019 Cripple Creek, Lewisville, TX (US) 75077-7518

( * ) Notice: Subject to any disclaimer, the term of this patent is extended or adjusted under 35 U.S.C. 154(b) by 0 days.

(21) Appl. No.: 10/704,290

(22) Filed: Nov. 7, 2003

Related U.S. Application Data

(62) Division of application No. 10/262,048, filed on Oct. 1, 2002, now Pat. No. 6,718,862.

(51) Int. Cl.[7] .................................................. F41G 5/18
(52) U.S. Cl. ..................... 89/41.21; 89/41.06; 244/3.16
(58) Field of Search .................. 89/41.06; 244/3.16, 244/100 R–100 A; 343/705, 708

(56) References Cited

U.S. PATENT DOCUMENTS

| | | | | |
|---|---|---|---|---|
| 3,485,151 A | * | 12/1969 | Taylor | 396/12 |
| 3,604,660 A | * | 9/1971 | Marley | 244/17.11 |
| 3,610,825 A | * | 10/1971 | Fritzel | 348/144 |
| 3,623,726 A | * | 11/1971 | Pittinger et al. | 273/361 |
| 4,354,419 A | * | 10/1982 | Patterson | 89/1.11 |
| 4,752,791 A | * | 6/1988 | Allred | 396/13 |
| 4,893,545 A | | 1/1990 | Sanderson | 89/37.19 |
| 4,966,063 A | | 10/1990 | Sanderson et al. | 89/37.22 |
| 4,974,499 A | | 12/1990 | Sanderson et al. | 89/1.4 |
| 5,024,138 A | | 6/1991 | Sanderson et al. | 89/37.22 |
| 5,093,677 A | * | 3/1992 | McMahon | 396/13 |
| 5,104,063 A | * | 4/1992 | Hartley | 244/103 S |
| 5,191,370 A | * | 3/1993 | Bozzolato | 396/13 |
| 5,206,454 A | | 4/1993 | Sanderson | 89/33.14 |
| 5,263,397 A | | 11/1993 | Sanderson | 89/37.22 |
| 5,282,589 A | * | 2/1994 | Branigan et al. | 244/114 R |
| 5,365,291 A | * | 11/1994 | Maeda | 396/12 |
| 5,419,234 A | | 5/1995 | Sanderson | 89/37.22 |
| 5,426,476 A | * | 6/1995 | Fussell et al. | 396/12 |
| 5,483,865 A | * | 1/1996 | Brunand | 89/41.21 |
| 5,589,901 A | * | 12/1996 | Means | 396/12 |
| 5,687,930 A | * | 11/1997 | Wagner et al. | 244/116 |
| 5,767,436 A | | 6/1998 | Sanderson et al. | 89/37.22 |
| 6,056,237 A | * | 5/2000 | Woodland | 244/3.15 |
| 6,176,167 B1 | | 1/2001 | Sanderson | 89/1.54 |
| 6,206,325 B1 | * | 3/2001 | Nunnally | 244/134 E |
| 6,250,196 B1 | | 6/2001 | Sanderson | 89/37.16 |
| 6,250,197 B1 | | 6/2001 | Sanderson | 89/37.16 |
| 6,293,179 B1 | | 9/2001 | Sanderson | 89/37.03 |
| 6,405,975 B1 | * | 6/2002 | Sankrithi et al. | 244/1 R |
| 6,469,783 B1 | * | 10/2002 | Wells et al. | 356/139.05 |
| 6,484,619 B1 | * | 11/2002 | Thomas et al. | 89/41.07 |
| 6,547,181 B1 | * | 4/2003 | Hoisington et al. | 244/46 |
| 6,592,071 B2 | * | 7/2003 | Kinkead et al. | 244/7 R |
| 6,626,398 B1 | * | 9/2003 | Cox et al. | 244/45 R |

FOREIGN PATENT DOCUMENTS

| | | | | |
|---|---|---|---|---|
| JP | 002231897 | * | 9/1990 | |
| WO | WO 9315955 A1 | * | 8/1993 | B05B/17/00 |

* cited by examiner

*Primary Examiner*—Jack Keith
*Assistant Examiner*—Troy Chambers
(74) *Attorney, Agent, or Firm*—Konneker & Smith, P.C.

(57) ABSTRACT

External armament apparatus, including a machine gun, an associated ammunition box for supplying belted ammunition to the gun, a flare dispenser, a missile launcher or other external stores apparatus, and a forward looking infrared sensor (FLIR), is exteriorly supported on a landing gear sponson tow plate of a helicopter, adjacent a cabin area gunner's window. The external mounting of the gun and other armament apparatus frees up cabin space, permits the gunner's window to be closed with the gun in a ready position, and permits a 0.50 caliber machine gun to be used an alternative to either a 7.62 mm mini-gun or a single barrel 7.62 mm machine gun adjacent the gunner's window.

13 Claims, 24 Drawing Sheets

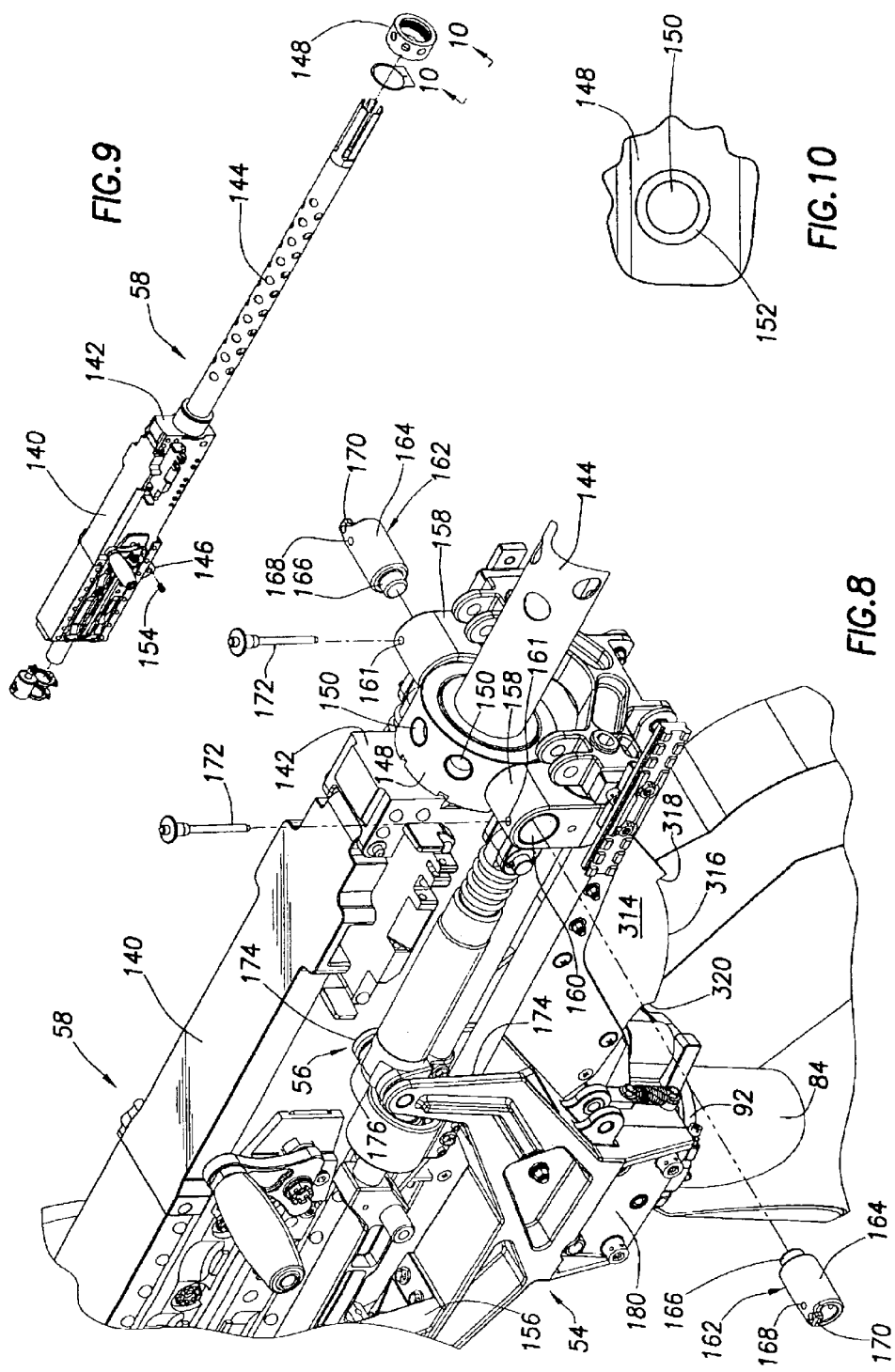

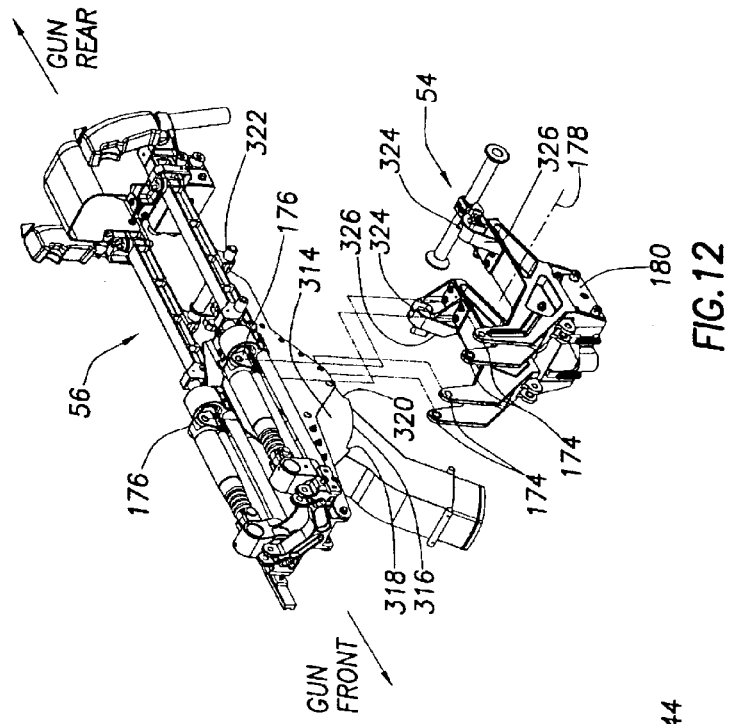

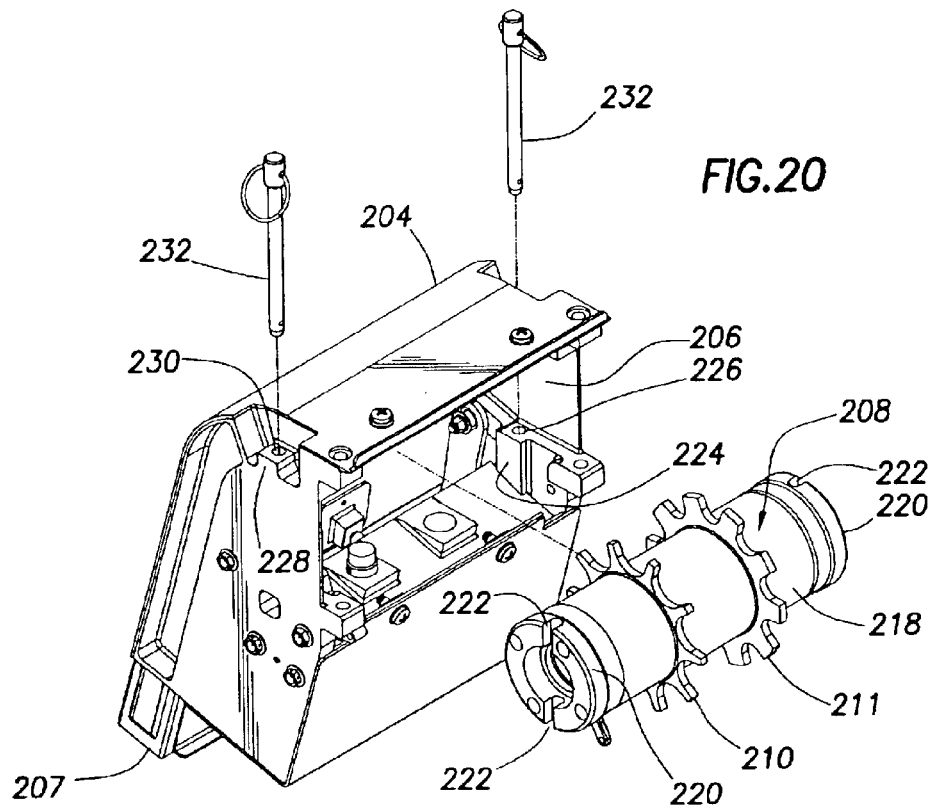
FIG.20
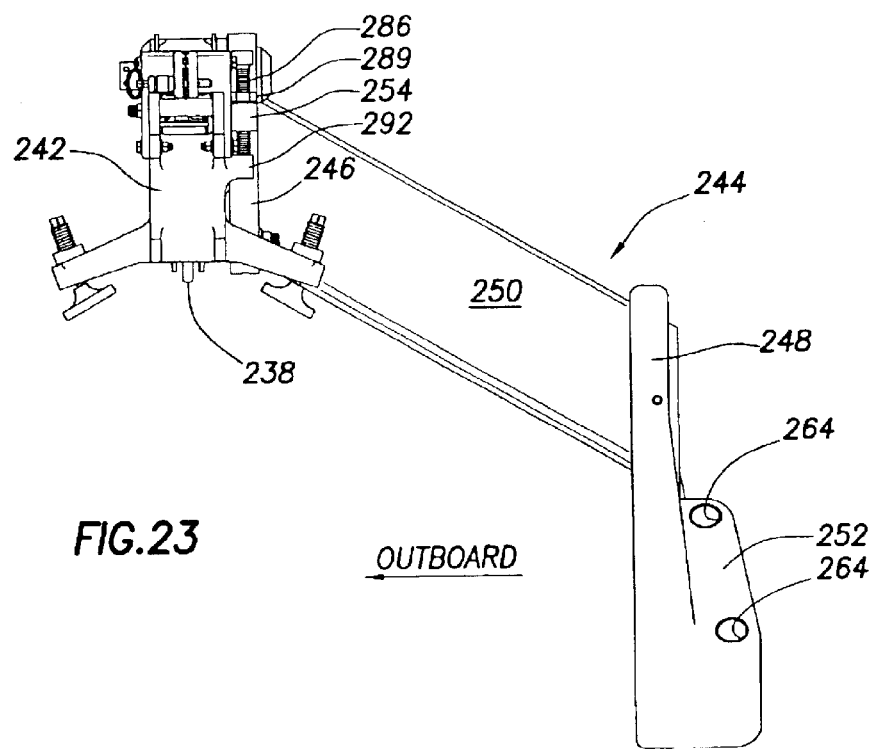
FIG.23 OUTBOARD

SPONSON TOW PLATE-MOUNTED HELICOPTER ARMAMENT APPARATUS AND ASSOCIATED METHODS

CROSS-REFERENCE TO RELATED APPLICATION

This application is a division of U.S. application Ser. No. 10/262,048 filed on Oct. 1, 2002, now U.S. Pat. No. 6,718,862, such prior application being incorporated by reference herein in its entirety.

BACKGROUND OF THE INVENTION

The present invention generally relates to aircraft armament apparatus and, in a preferred embodiment thereof, more particularly relates to the external mounting of armament apparatus on a helicopter.

The "Blackhawk" military helicopter has a cabin area positioned behind the cockpit area and having sliding gunner's windows on opposite sides thereof. Using conventional mounting techniques, either 7.62 mm mini-guns or single barrel 7.62 mm machine guns may be mounted on the horizontal sill areas of these gunner's windows on articulated support linkage assemblies that permit the guns to be swung outwardly through the opened windows to use orientations, or inwardly through the opened windows to storage orientations. Various well-known problems, limitations and disadvantages are associated with this conventional helicopter armament mounting technique.

For example, with both the 7.62 mm mini-guns and the single barrel 7.62 mm machine gun, the articulated, sill-mounted support structure for the gun has an undesirable amount of positional "play" therein which, although necessary for gun adjustment and deployment, substantially degrades the firing accuracy of the gun. Additionally, while the single barrel 7.62 mm machine gun has an ammo box mounted directly on the gun, the 7.62 mm mini-gun has an external ammo box that must be positioned in the adjacent cabin area, with the belted ammunition fed from the ammo box, out the gunner's window and to the gun. This, of course, undesirably clutters up the cabin area. Another problem associated with this sill mounting of both the 7.62 mm mini-gun and the 7.62 mm single barrel machine gun is that the gunner's windows cannot be closed with the guns in their ready positions. This inability to close these windows leads to uncomfortably cold cabin temperatures during cold weather missions, and fuel mist potentially entering the cabin area during in-flight refueling.

With either the 7.62 mm mini-gun or the 7.62 mm single barrel machine conventionally mounted on a cabin area gunner's window sill, the maximum upward firing angle of the gun relative to horizontal is approximately 1.5 degrees. This is due to the fact that, with the sill-mounted gun pointed forwardly along a side of the helicopter, this is the maximum upward firing elevation angle of the gun that (with a predetermined margin of safety) will position its bullet path safely beneath the helicopter's forwardly drooped rotor blade tip path to preclude bullet impact with the spinning rotor blades. This 1.5 degree maximum upward elevational firing angle of the gun undesirably limits the maximum firing range of the gun when the gun is swung away from its forwardly pointed orientation —for example when it is being fired off to the side of the helicopter or to the rear thereof.

Yet another limitation presented by this conventional helicopter window sill-mounting of machine guns is that larger machine guns, such as to 0.50 caliber machine guns, are difficult to deploy, and, because of their weight, intensify crash load issues.

These problems, limitations and disadvantages associated with conventional gunner's window sill mounting of machine guns were addressed by the present applicant's helicopter sponson tow plate-mounted armament apparatus illustrated in his U.S. Pat. No. 6,250,197, the disclosure of which is hereby incorporated by reference herein in its entirety. In such armament apparatus, a machine gun, ammo box and flare dispenser are externally mounted, adjacent a gunner's window, on a specially designed landing gear sponson replacement tow plate. The external machine gun mounting permitted by this specially designed system frees up cabin space, permit's the gunner's window to be closed with the gun in a ready position, and permits a 0.50 caliber machine gun to be used as an alternative to either a 7.62 mm mini-gun or a single barrel 7.62 mm machine gun adjacent the gunner window.

While the tow plate-mounted helicopter armament apparatus illustrated and described in U.S. Pat. No. 6,250,197 provides the advantages set forth above, it has been found in the development of the system that it would be desirable to provide it with various modifications and improvements to the design —such as improved positioning of its components, the provision of additional external armament, cost reduction, enhanced positional control of the machine gun, and maintenance and installation simplification —would be desirable. It is to these improvements in the design of the sponson tow plate-mounted external helicopter armament apparatus illustrated and described in U.S. Pat. No. 6,250,197 that the present invention is primarily directed.

SUMMARY OF THE INVENTION

In carrying out principles of the present invention, in accordance with a preferred embodiment thereof, specially designed external armament apparatus is secured to an aircraft landing gear structure, representatively a landing gear sponson tow plate of a helicopter. Although various components of the armament apparatus may be deleted, and various component combinations may be utilized depending on the helicopter's mission, in a representatively complete form thereof the external armament apparatus illustratively comprises:

1. A pintle arm assembly secured to and projecting upwardly from a central outboard side portion of the tow plate;
2. A yoke assembly secured to an upper end portion of the pintle arm assembly for horizontal pivoting relative thereto;
3. A cradle assembly secured to the yoke assembly for horizontal pivoting therewith and vertical pivoting relative thereto;
4. A machine gun, representatively a .50 caliber machine gun, operatively carried by the cradle assembly;
5. An ammunition box/booster assembly mounted on a top side edge portion of the tow plate, inboard of the pintle arm assembly, and adapted to hold a length of belted ammunition feedable to the machine gun;
6. A flare dispenser mounted on a rear end portion of the tow plate and positioned generally beneath the pivot area of the machine gun;
7. An external stores assembly including a support structure secured to the outboard side of a lower end portion of the pintle arm assembly and external stores apparatus, representatively a missile launcher, operatively mounted on the support structure; and 8. A forward-looking infrared (FLIR) sensor secured to a front end portion of the tow plate.

The machine gun, which may be of various types, including, for example, a 0.50 caliber gun, a 7.62 mm mini-gun, or a single barrel 7.62 mm machine gun, is operatively supported outside a gunner's window to thereby permit the window to be closed when the gun is not being used, and the external positioning of the ammunition box reduces clutter in the cabin area of the helicopter. The positioning of the flare dispenser beneath the pivot area of the machine gun prevents potential interference between the flare dispenser and the gun barrel/projectile path when the gun is being pivoted in a depressed elevational orientation.

In one illustrative embodiment thereof, the pintle arm assembly includes a pintle block member secured to a central outboard side portion of the tow plate and has an opening extending therethrough along an upwardly and rearwardly inclined axis. An elongated, substantially straight support arm member extends along a longitudinal axis and has a lower end portion coaxially locked within the pintle block opening by a transverse retaining pin structure. The lower end of the support arm has a conically tapered annular outer side surface portion which engages a similarly tapered interior surface portion of the pintle block opening. A tapered annular collet member is forced against a second conically tapered annular interior surface area of the pintle block opening by a nut tightened onto a threaded lower end of the support arm.

In an alternate embodiment of the pintle arm assembly, the support arm has a uniform cross-section along its length and is captively retained within the pintle block opening by a pair of expansion pins extending transversely through the pintle block and the lower end of the support arm.

The machine gun, and its associated cradle and yoke assemblies, are mounted on the rearwardly and upwardly offset upper end of the installed support arm for azimuth and elevation rotation relative to the pintle arm assembly respectively about vertical and horizontal axes, the vertical axis representatively being forwardly and upwardly inclined relative to a vertical reference axis at a small angle which is preferably about three degrees to match the rotor system forward tilt.

According to another feature of the invention, a specially designed elevation limiting system may be associated with the machine gun, when the external stores assembly is included in the overall external armament apparatus, and serves to prevent the gun's bullet path from intersecting a front portion of the installed missile launcher assembly when the gun is in a forward portion of its azimuth arc. The elevation limiting system functions, in response to horizontal azimuth rotation of the gun, to automatically provide a downward gun rotation limit angle which, with the gun in a predetermined forward portion of its azimuth arc, is less than the downward gun rotation limit angle when the gun is in a predetermined rearward portion of its azimuth arc.

In a preferred embodiment thereof, the elevation limiting system includes a cam follower/stop member carried for variable driven rotation parallel to the gun's vertical azimuth rotation axis and functioning to variably block downward rotation of the gun cradle portion in forward and rearward gun azimuth travel arcs.

In accordance with another aspect of the invention, a portion of the machine gun is removably secured to the cradle structure using an annular trunnion nut member secured to the gun and positioned between two support block portions of the cradle. A diametrically opposite pair of radial openings extending through the trunnion nut are aligned with horizontal openings extending through the support blocks. To releasably lock the trunnion nut to the support blocks, a pair of specially configured nonthreaded locking studs are provided and are inserted inwardly through the support block openings so that nonthreaded inner end portions of the studs are received in the opposed trunnion nut openings. The inserted studs are releasably locked in place within the horizontal support block openings by suitable retaining pins extending downwardly through upper end openings in the support blocks and having lower end portions received in transverse openings in the inserted studs.

According to another feature of the invention, the external stores assembly includes an external stores support structure anchored to the pintle support block and projecting in an outboard direction from the tow plate, and provided with adjustment structure permitting the external stores apparatus which it carries to be pivotally adjusted about at least one axis relative to the support structure. Representatively, this adjustment structure provides for elevational adjustment of the external stores apparatus and includes front and rear elevation adjustment bolts that bear against, and may be variably adjusted relative to, portions of the supported external stores apparatus. As used herein, the term "external stores" encompasses armament apparatus, such as missiles, rockets and rocket launchers, additional guns, electronics, etc. which are carried externally to the aircraft and are typically, though not necessarily, jettisonable.

In accordance with another aspect of the invention, the forward-looking infrared sensor is secured to a front end portion of the tow plate in a manner positioning the sensor in a forwardly spaced apart relationship with the tow plate. This positioning is representatively achieved using a mounting structure including a rear block portion secured to a front edge portion of the tow plate, an elongated mounting member longitudinally projecting forwardly from the rear block portion and having a front end, and a front block portion secured to the front mounting member end and overlying and being secured to a top end portion of the sensor.

The feed booster portion of the ammunition box/booster assembly includes a booster housing having disposed therein a sprocketed electric drive motor operable to engage an ammunition belt disposed in the ammunition box and drive it outwardly therefrom for delivery to the machine gun during firing thereof. According to yet another aspect of the invention, the drive motor is mounted in a removable booster housing portion of the ammunition box/booster assembly in a unique manner permitting the motor to be operatively installed in and removed from the booster housing without the use of tools of any sort.

Representatively, the motor is provided with opposite mounting end portions through which locking openings extend. The motor is inserted into the booster housing, through an access opening therein, in a manner positioning the motor end locking openings between facing exterior and interior mounting opening sets formed in the booster housing. Removable pin members are inserted through the aligned housing motor openings to captively retain and operatively position the motor within the booster housing. By simply removing the booster housing from the ammunition box and removing these pins, the motor can be removed from the booster housing without the use of tools, and a replacement motor can be positioned in the removed booster housing similarly without the use of tools.

BRIEF DESCRIPTION OF THE DRAWINGS

FIG. 8 is an enlarged scale, partially exploded perspective view of a part of the armament apparatus portion shown in FIG. 7, with an ammunition box portion removed therefrom for illustrative purposes;

FIG. 9 is a partially exploded perspective view of the machine gun portion of the armament apparatus;

FIG. 10 is an enlarged scale partial outer side elevational view of a trunnion nut portion of the machine gun taken generally along line 10—10 of FIG. 9;

FIG. 11 is a partially exploded perspective view of the armament apparatus portion shown in FIG. 7, with machine gun and ammunition box portions removed therefrom;

FIG. 12 is a partially exploded perspective view of a yoke and cradle assembly portion of the armament apparatus;

FIG. 20 is a partially exploded perspective view of the booster portion shown in FIG. 19;

FIG. 23 is a front side elevational view of the missile supporting structure of FIG. 21;

DETAILED DESCRIPTION

Figure 1:
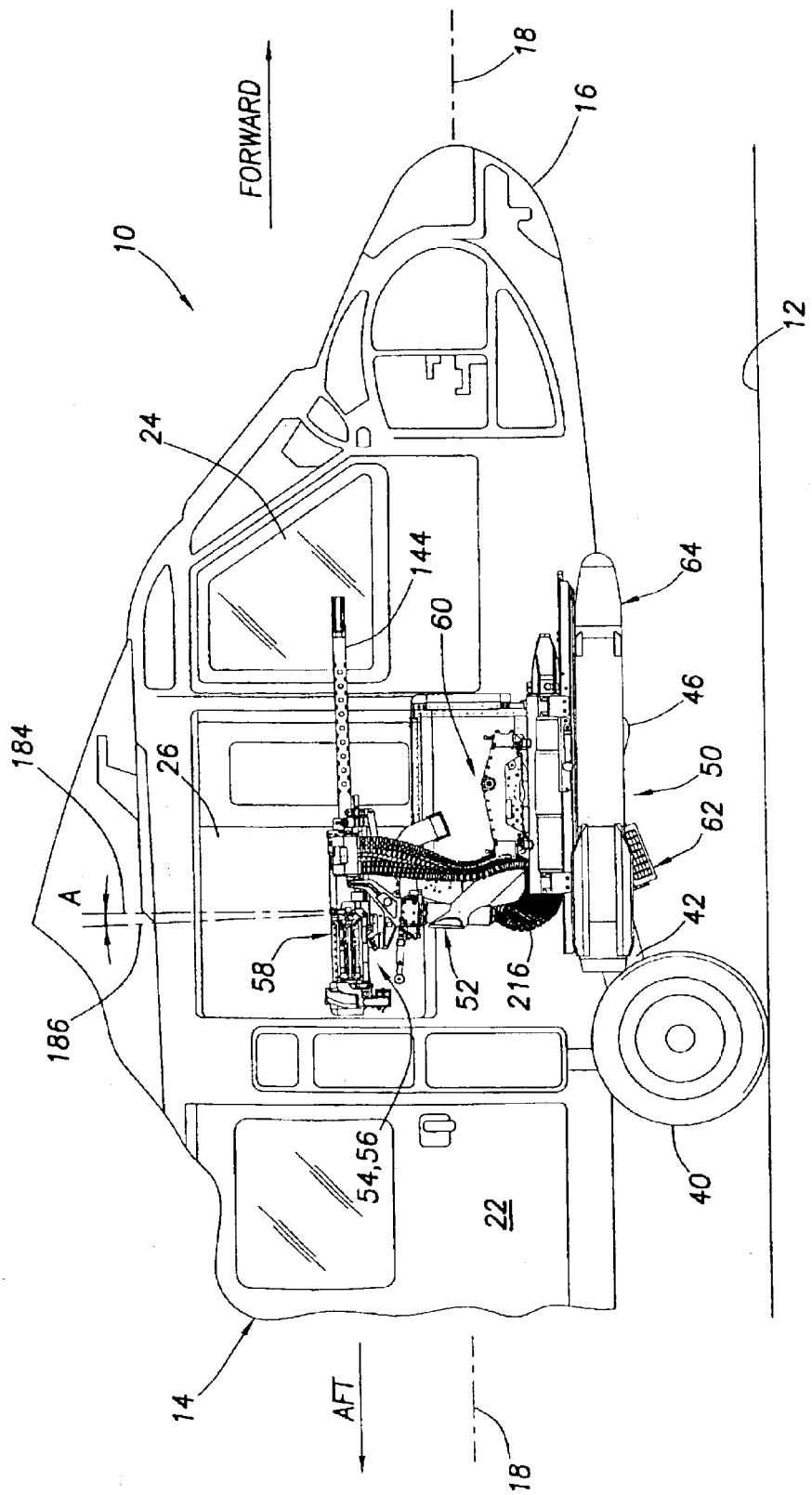
FIG. 1 is a right side elevational view of a front portion of a representative helicopter having mounted on a sponson tow plate portion thereof external armament apparatus embodying principles of the present invention.
Figure 26:
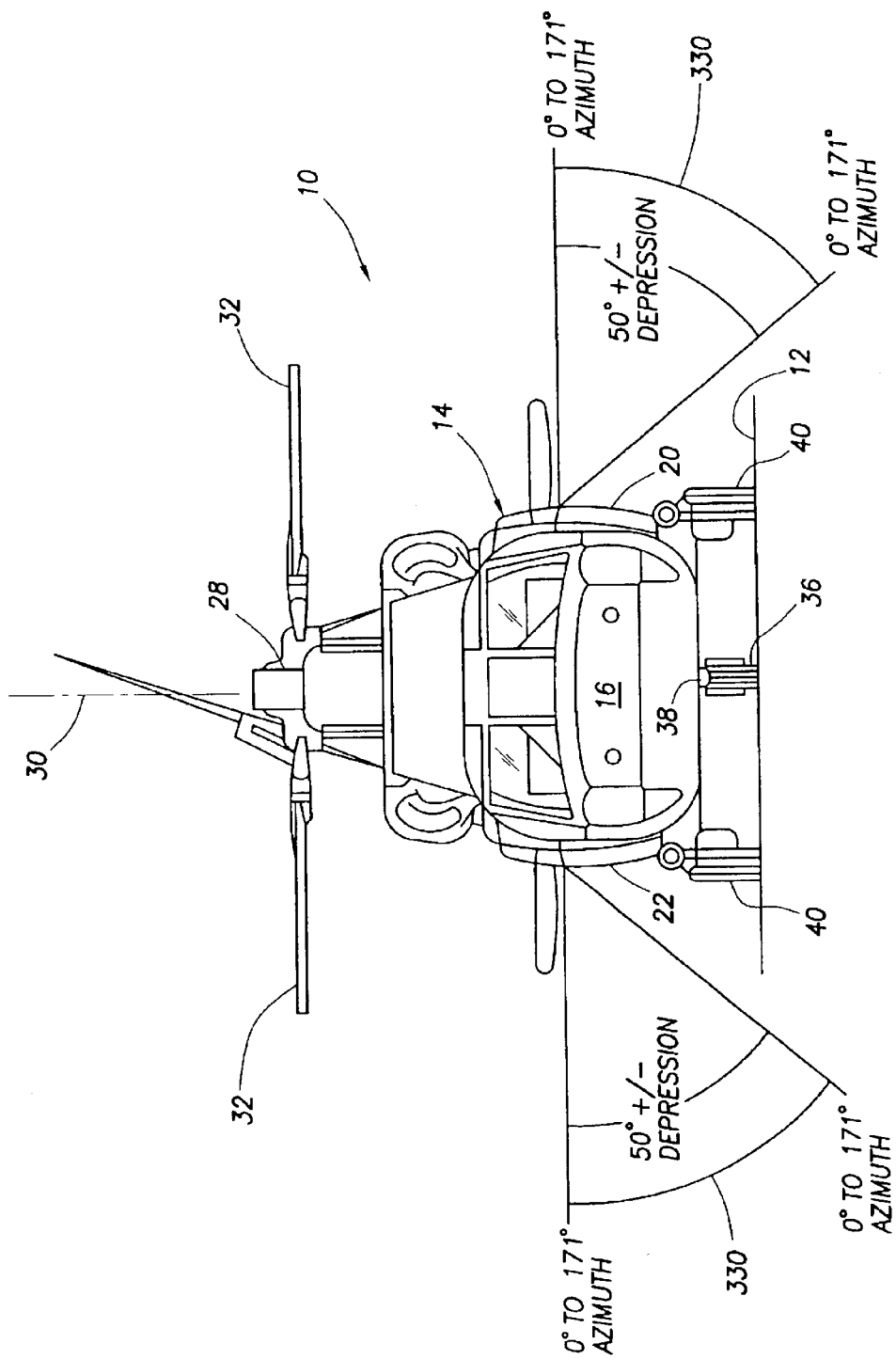

Illustrated in FIGS. 1 and 26 is a front portion of a helicopter 10, representatively a UH-60 Blackhawk military helicopter, which is parked on the ground 12 and has a horizontally elongated body 14 with a front end 16 and a rear end (not shown) spaced apart along a longitudinal reference axis 18 extending parallel to the ground 12. The helicopter body 14 has a left side 20 and a right side 22. At the front end portion 16 of the body 14 is a cockpit area 24 positioned forwardly of a cabin area having sliding gunner's windows 26 on its left and right sides 20, 22. A vertically upwardly projecting motor-driven mast structure 28 (see FIG. 26) is disposed rearwardly of the gunner's windows 26 and is rotatable about a generally vertical mast axis 30 that is forwardly inclined at a small angle, representatively about three degrees. In a conventional manner, the mast structure 28 rotationally drives generally horizontally oriented rotor blades 32 (shown in longitudinally shortened form in FIG. 26) about the mast axis 30, with the rotationally driven rotor blades 32 having a blade tip envelope (not shown) with a downwardly depressed front end portion (also not shown).

Figure 2:
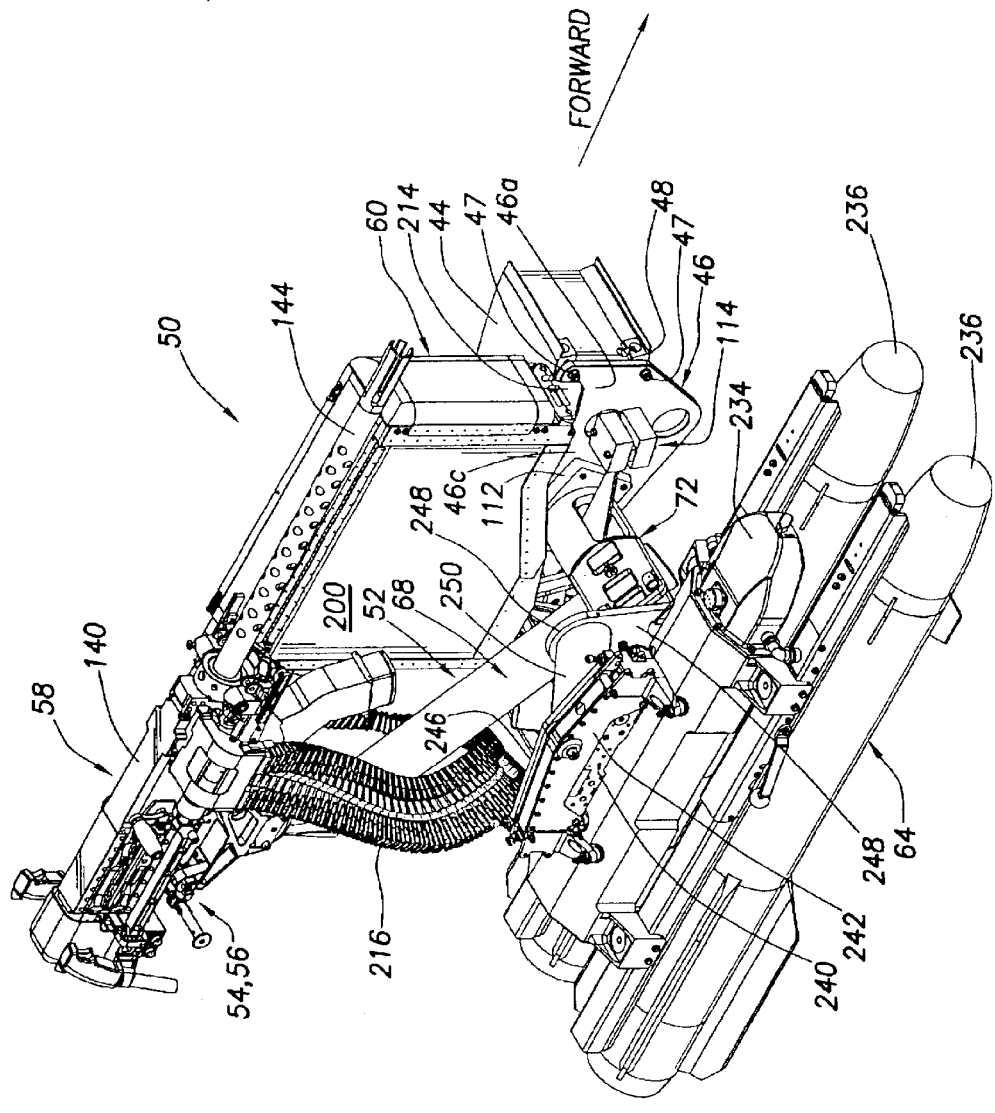
FIG. 2 is a front outboard top perspective view of the armament apparatus.
Figure 3:
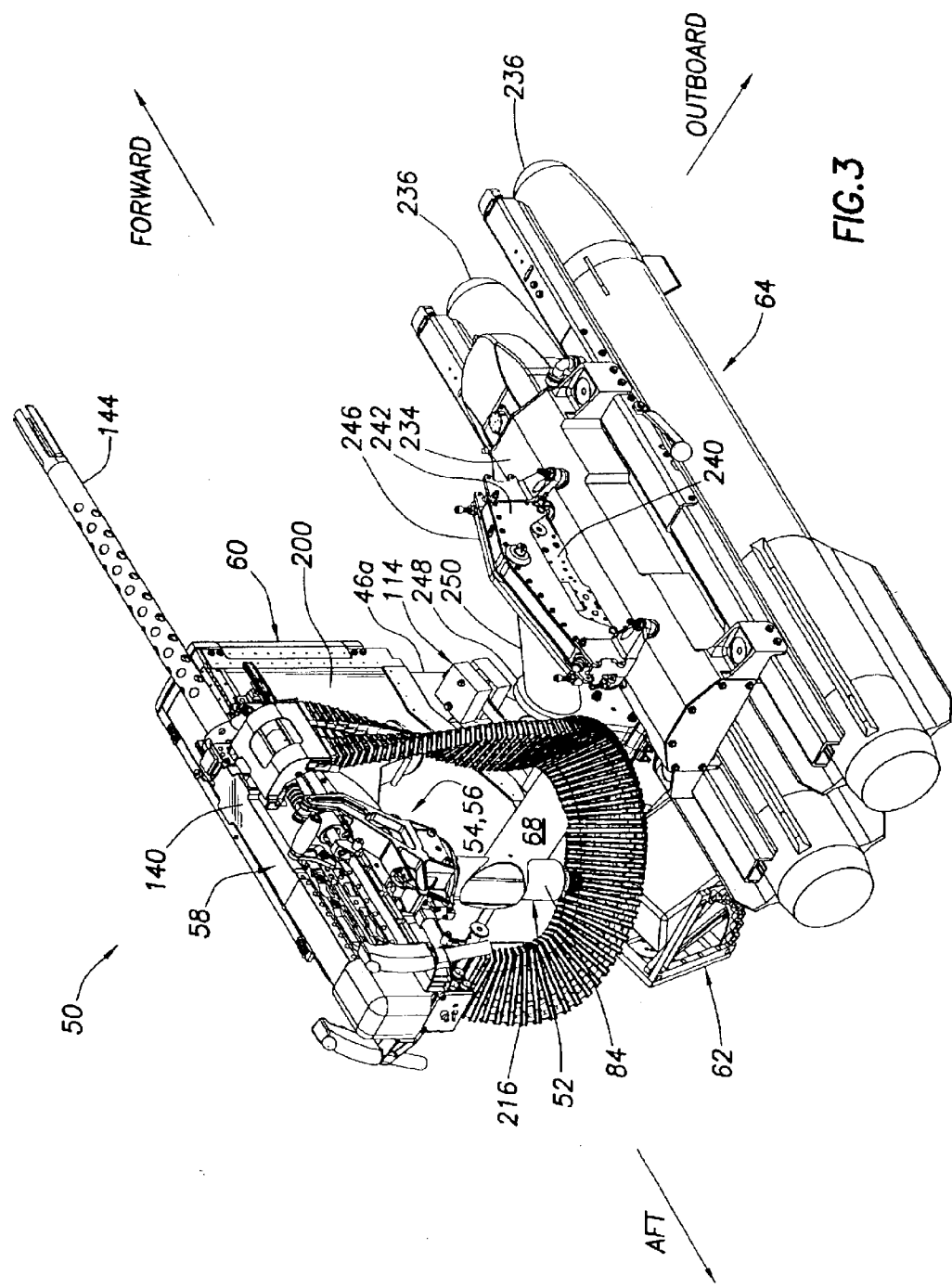
FIG. 3 is a rear outboard top perspective view of the armament apparatus.

Helicopter 10 is rollingly supported on the ground 12 by a rear landing wheel 36 carried on a strut structure 38 (see FIG. 26) extending downwardly and rearwardly from the rear end portion of the body 14, and left and right forward landing wheels 40. The left and right landing wheels 40 are operatively secured to left and right strut structures 42 (see FIG. 1) that extend downwardly and rearwardly from left and right wheel support sponsons 44 (see FIG. 2) that project outwardly from the left and right sides of the helicopter body 14 generally below the gunner's windows 26. The right sponson 44 is illustrated in FIG. 2 and, like the left sponson 44, has a metal tow plate 46 suitably bolted, as at 47, to its outboard side 48.

Figure 16:
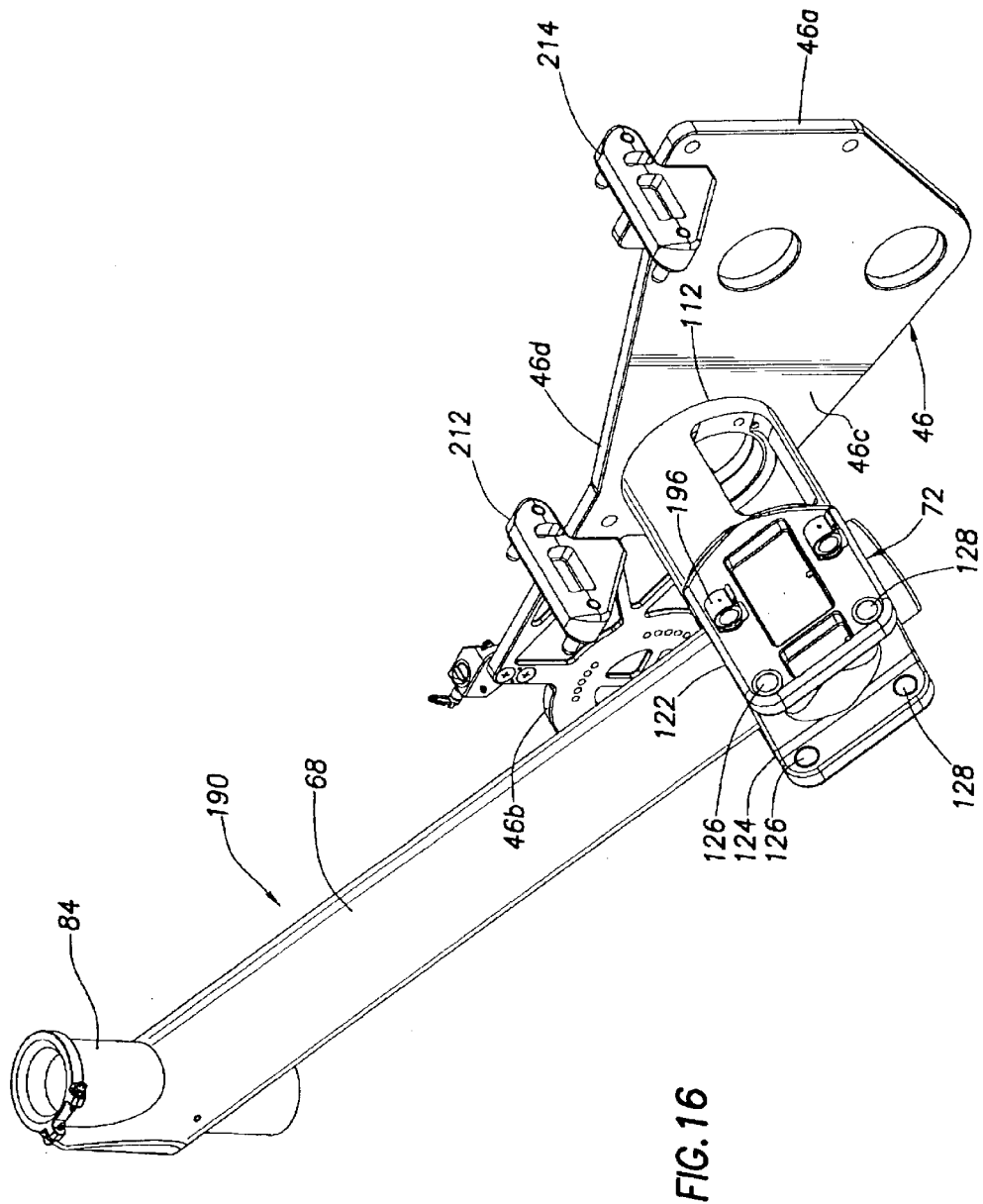
FIG. 16 is an assembled perspective view of an alternate embodiment of pintle arm and pintle support block portions of the armament apparatus.
Figure 17:
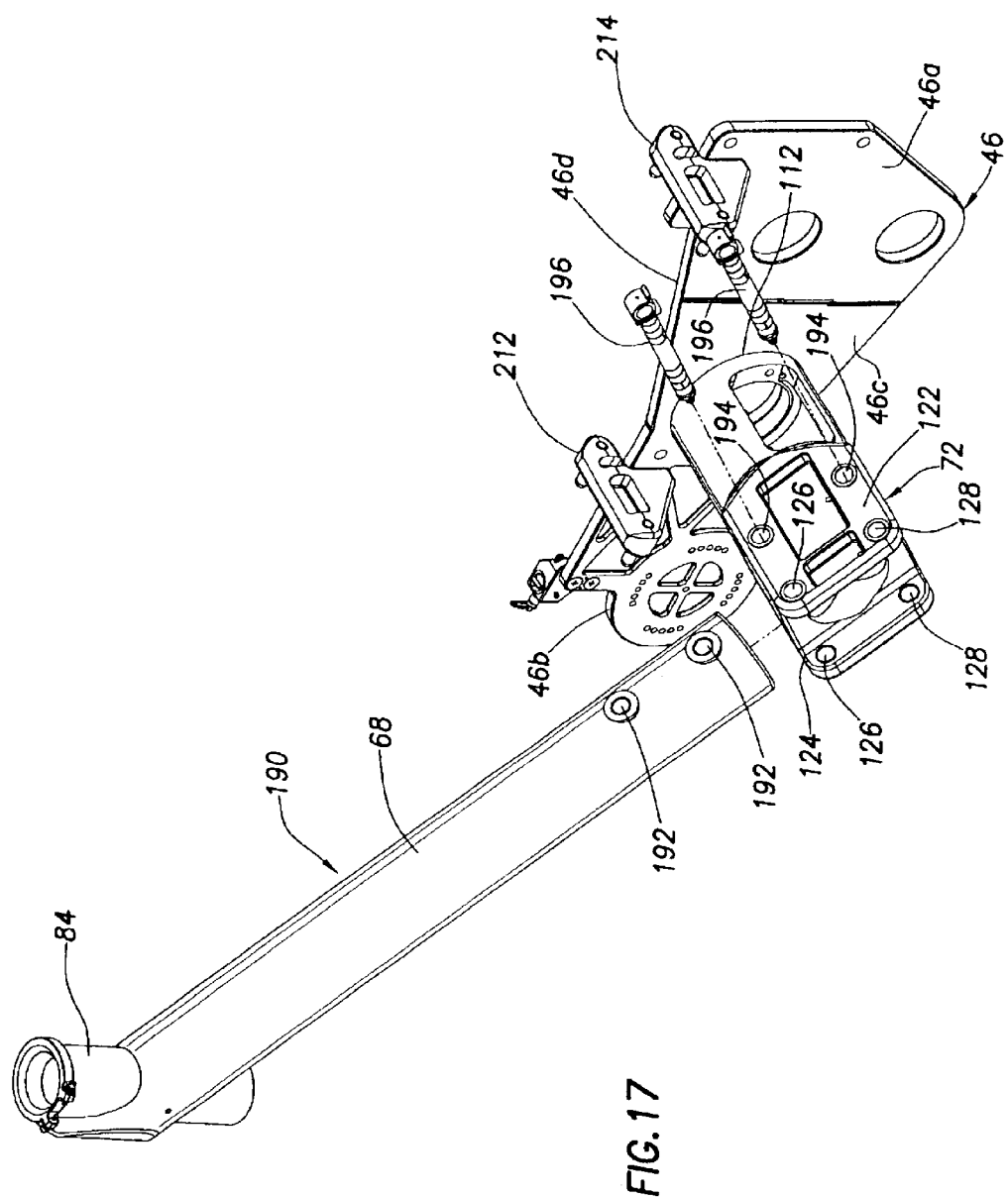
FIG. 17 is an exploded perspective view of the pintle support arm and support block portions of the armament apparatus shown in FIG. 16.
Figure 18:
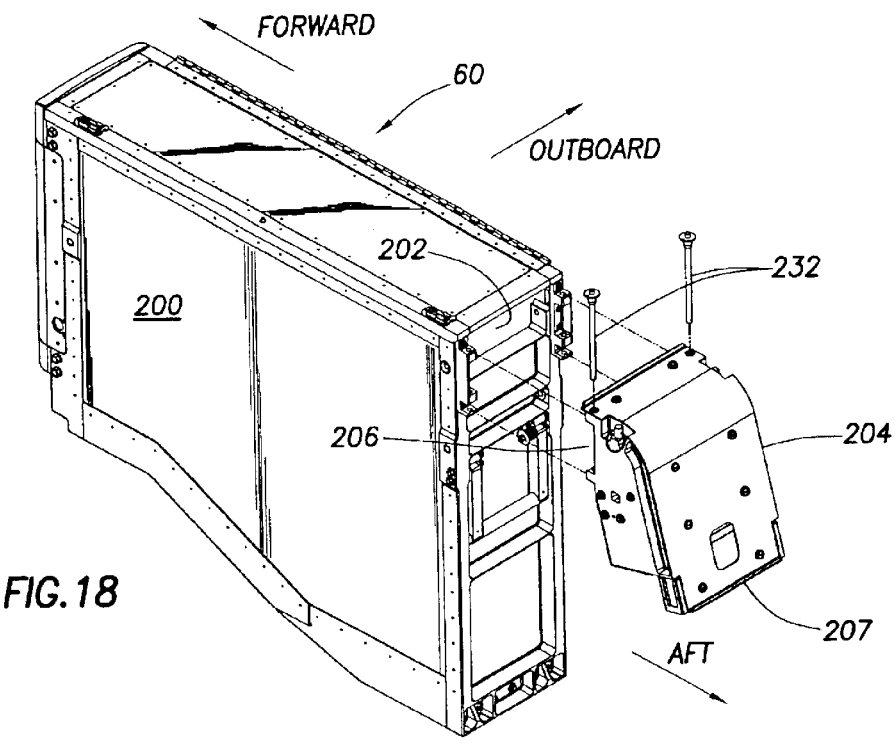
FIG. 18 is a partially exploded perspective view of an ammunition box/booster assembly portion of the armament apparatus.

The tow plates 46 replace the tow plates originally installed on the sponsons 44, and are larger and stronger that the original tow plates, and, as the name implies, are used as attachment points for towing the helicopter 10 along the ground 12. The tow plates 46 are also used for tying the helicopter down. As best illustrated in FIGS. 16 and 17

Figure 6:
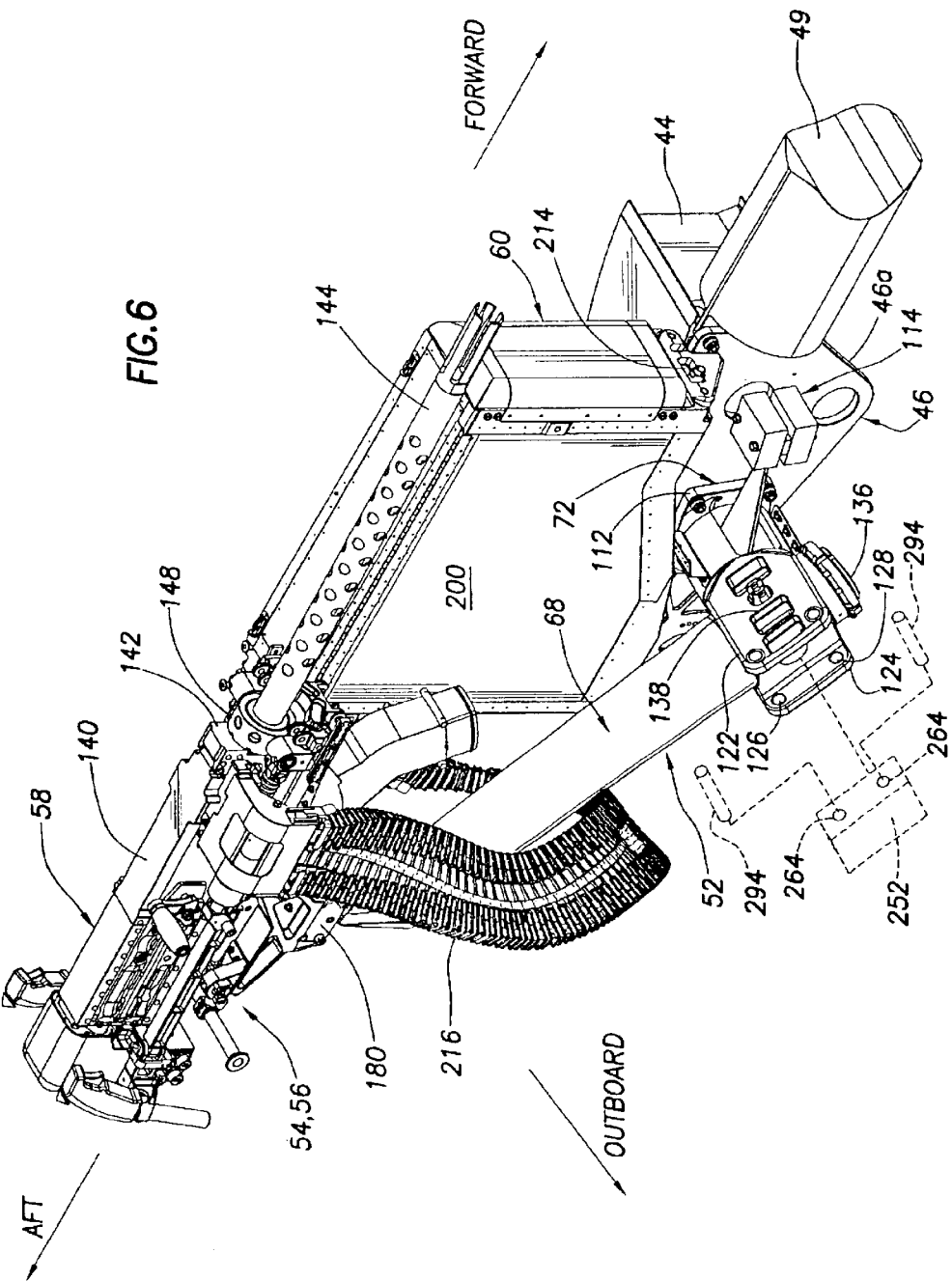
FIG. 6 is a front outboard top perspective view of the armament apparatus with an outboard missile portion removed therefrom for illustrative purposes.
Figure 7:
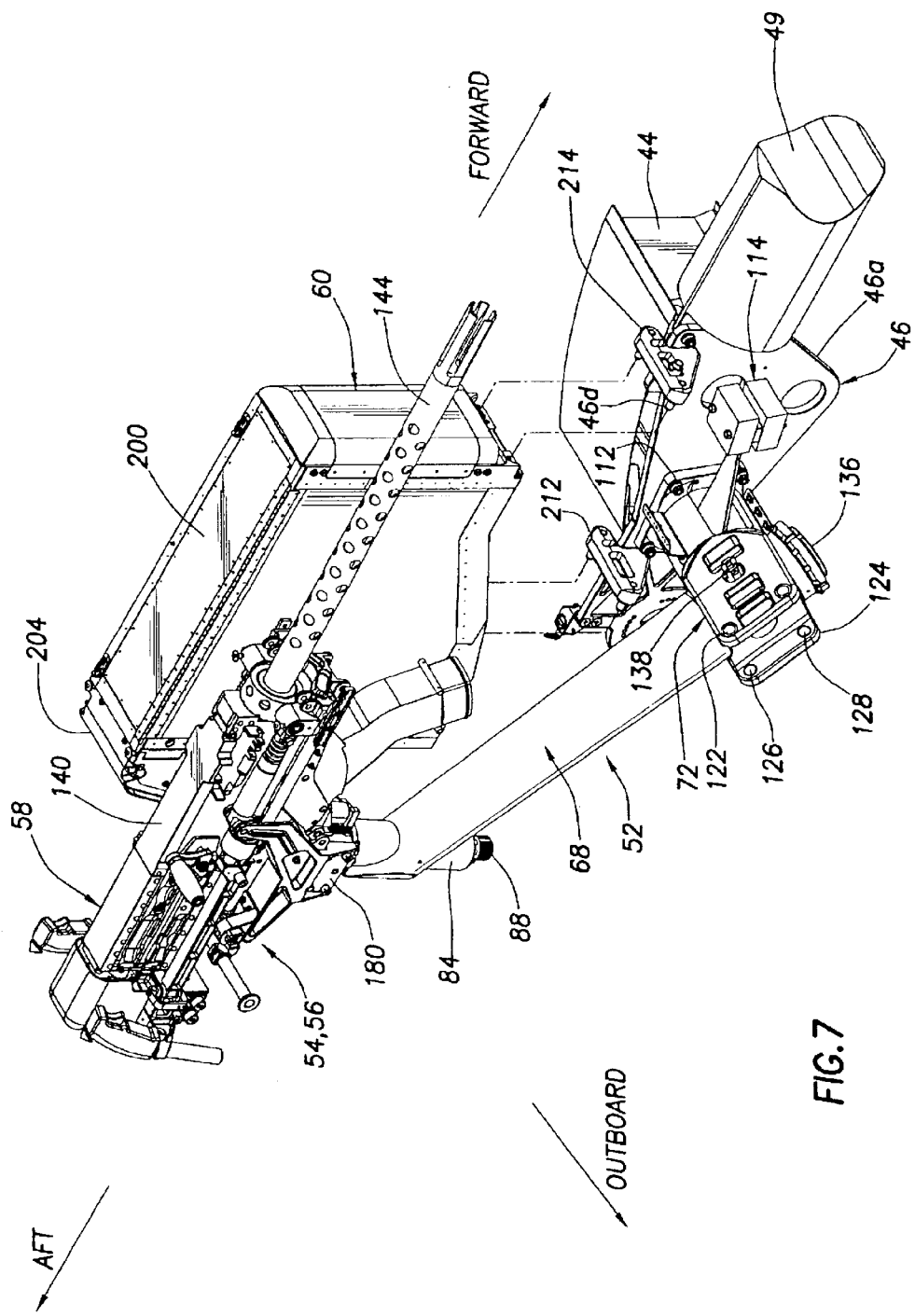
FIG. 7 is a partially exploded perspective view of the armament apparatus portion shown in FIG. 6, with an ammunition belt removed therefrom for illustrative purposes.

(which show the right tow plate 46), each tow plate 46 has a horizontally elongated plate-like configuration, and has a front or forward portion 46a (at which a refueling boom structure 49 may be secured to the sponson 44 as shown, for example, in FIGS. 6 and 7), a generally circularly shaped rear or aft portion 46b, a horizontally central portion 46c, and a top edge portion 46d.

Referring briefly to FIGS. 1–5 and 24, specially designed external armament apparatus 50 is operatively mounted on each of the left and right sponson tow plates 46. The external armament apparatus 50 on each side of the helicopter 10 has the same components (some or all of which may be selectively mounted on their associated tow plate depending on the particular mission of the helicopter), with only the right side external armament apparatus 50 being illustrated herein. The representatively illustrated right side armament apparatus 50 (with its full complement of components) includes:

1. A pintle arm assembly 52 secured to and projecting upwardly from the outboard side of the tow plate 46;
2. A yoke assembly 54 secured to an upper end portion of the pintle arm assembly 52 for horizontal pivoting relative thereto;
3. A cradle assembly 56 secured to the yoke assembly 54 for horizontal pivoting therewith and vertical pivoting relative thereto;
4. A machine gun 58 operatively carried by the cradle assembly 56;
5. An ammunition box/booster assembly 60 mounted on the top side edge portion 46d of the tow plate 46, inboard of the pintle arm assembly 52, and adapted to hold a length of belted ammunition feedable to the machine gun 58;
6. A flare dispenser 62 mounted on the rear end portion 46b of the tow plate 46 and positioned generally beneath the pivot area of the machine gun 58;
7. An external stores assembly representatively including a missile launcher assembly 64 (or other external stores apparatus) secured to the outboard side of a lower end portion of the pintle arm assembly 52 by an external stores support structure; and
8. A forward-looking infrared (FLIR) sensor 66 (see FIG. 24) secured to the front end edge portion 46a of the tow plate 46.

Turning now to FIGS. 11 and 13–15, the pintle arm assembly 52 includes an elongated, substantially straight tubular support arm member 68 which longitudinally extends along a rearwardly and upwardly inclined axis 70 (see FIG. 15), and a pintle support block 72. Support arm 68 has a reduced diameter lower end portion 74 with an externally threaded lower end 76 spaced downwardly apart from a diametrically opposite pair of radially extending circular sidewall locking openings 78 (only one of which is visible in the drawings) in the lower end portion 74. Immediately above the openings 78 the support arm 68 has a conically tapered annular portion 80 that joins the lower end portion 74 to a larger diameter main longitudinal portion 82 of the support arm 68.

Welded or otherwise anchored to the upper end of the longitudinal support arm portion 82 is a generally vertically oriented tubular socket member 84 that downwardly and coaxially receives a tubular mounting stud 86 having an externally threaded lower end 88, a conically tapered portion 90 disposed above the threaded end 88 and directly below an azimuth stop plate 92. Plate 92 has a circumferentially spaced pair of azimuth stop projections 94 formed thereon, and an enlarged diameter tubular upper end portion 96, having an annular exterior groove 98 formed thereon, extends upwardly from the azimuth stop plate 92.

In a manner similar to that shown in the aforementioned U.S. Pat. No. 6,250,197 incorporated herein by reference, the tubular mounting stud 86 is releasably retained within the socket 84 by inserting the stud 86 downwardly into the socket 84 until the tapered stud portion 90 engages a complementarily configured interior tapered surface 100 on the socket, sequentially placing an annular tapered collet member 102 and a lock nut washer 104 on the lower stud end, and then tightening a lock nut 106 onto the threaded stud end 88 to draw the tapered collet member into engagement with a complementarily configured interior surface portion of the socket 84. Before the lock nut 106 is tightened, a downwardly projecting locating pin 108 on the azimuth stop plate 92 is inserted into a peripheral groove 110 on the upper end of the socket 84 to rotationally align the inserted stud 86 with the socket 84 in a predetermined manner.

Figure 15:
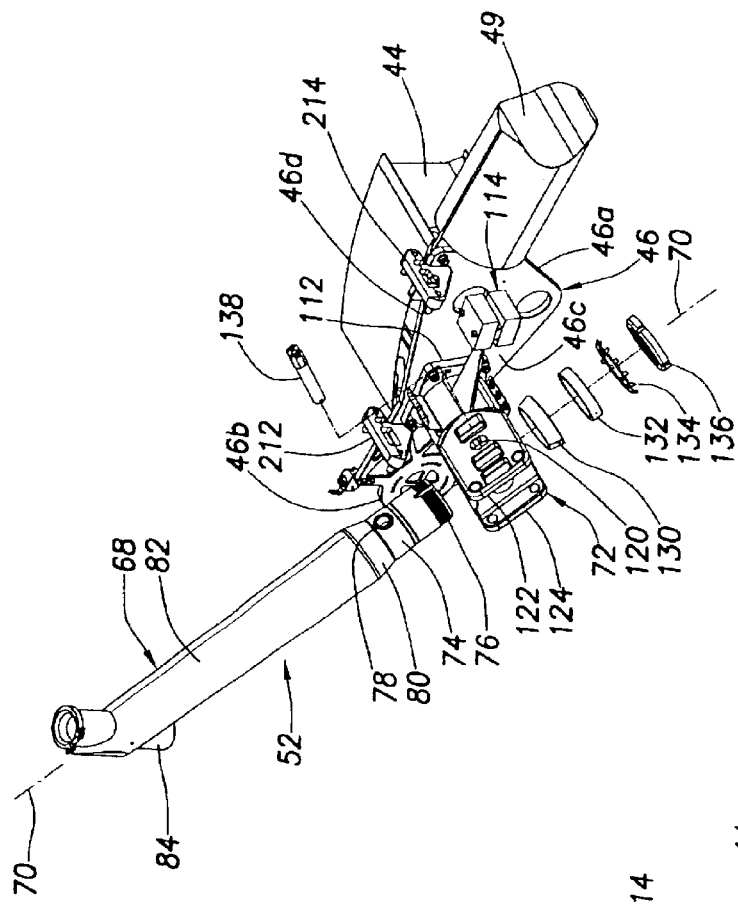
FIG. 15 is a partially exploded perspective view of the armament apparatus portion shown in FIG. 13, with a support stud portion removed therefrom.
Figure 13:
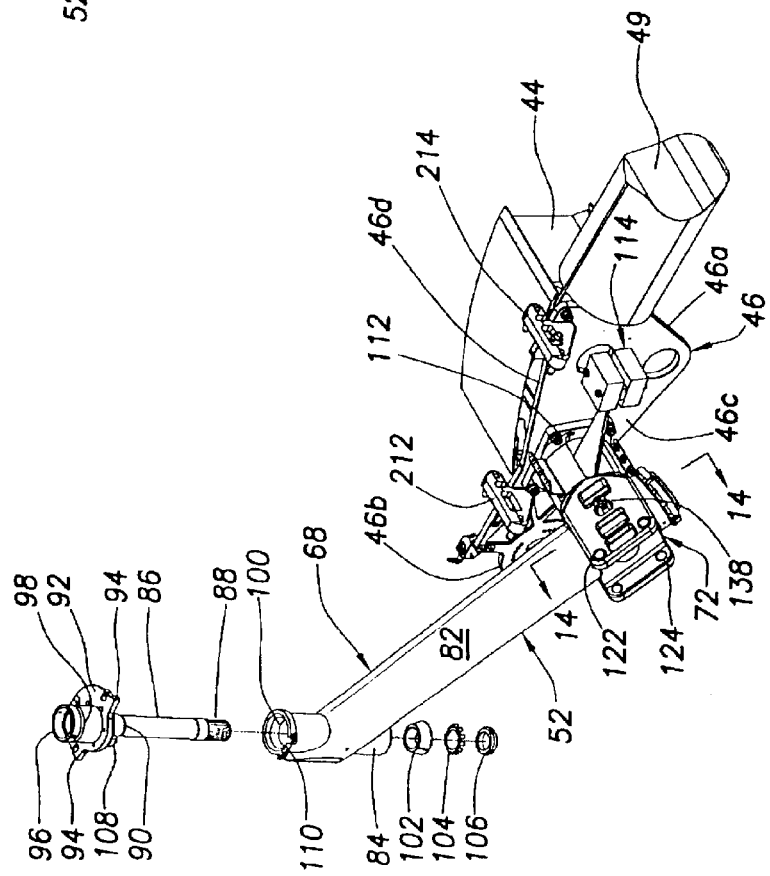
FIG. 13 is a partially exploded perspective view of the armament apparatus portion shown in FIG. 11, with the yoke and cradle assembly portion removed therefrom.
Figure 14:
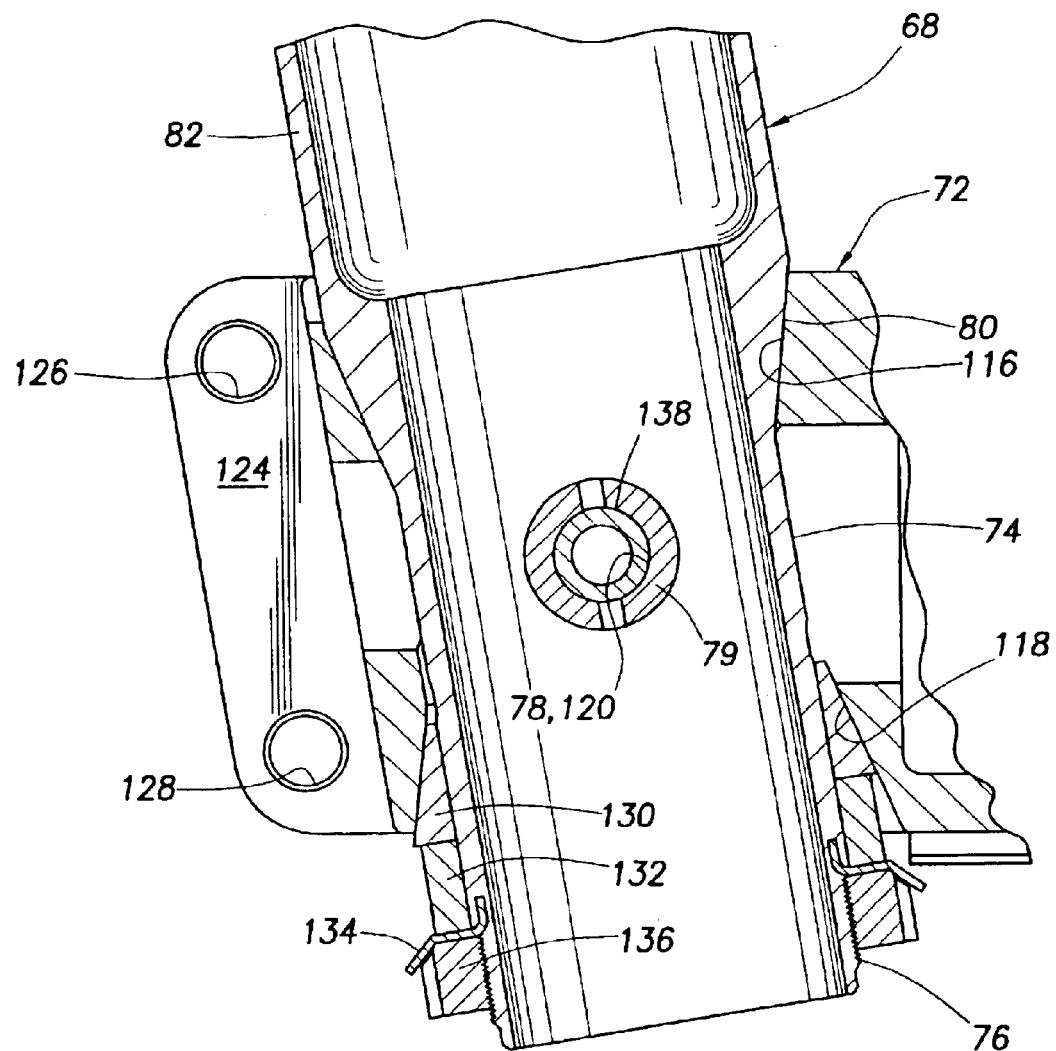
FIG. 14 is an enlarged scale cross-sectional view through a pintle support block portion of the armament apparatus taken generally along line 14—14 of FIG. 13.

With reference now to FIGS. 13–15, the pintle block structure 72 is elongated in an inboard-outboard direction and has an inboard flanged end portion 112 which is suitably bolted to the horizontally central portion 46c of the tow plate 46. Just outboard of the flange 112 a harmonic balancer structure 114 (similar to the harmonic balancer structure 508 shown in U.S. Pat. No. 6,250,197) is secured to the pintle block structure 72 and forwardly projects outwardly therefrom. Outboard of the harmonic balancer structure 114 is a hollow body portion of the pintle block structure 72 which has spaced apart top and bottom walls in which circularly cross-sectioned openings 116,118 respectively extend. Openings 116,118 have oppositely tapered conical interior surfaces, and are spaced apart along an axis parallel to the longitudinal support arm axis 70.

Positioned between the interior surface portions 116,118 are a diametrically opposite pair of circularly cross-sectioned sidewall locking openings 120 extending transversely through the pintle block structure body. For purposes later described herein, a spaced pair of parallel mounting flanges 122,124 project outwardly from the outboard end of the pintle block structure, with each of the mounting flanges 122,124 having a spaced pair of circular openings 126,128 formed therethrough.

As best illustrated in FIGS. 14 and 15, the pintle arm assembly 52 further includes an annular tapered collet 130, an annular spacer member 132, an annular lock washer 134, and a lock nut 136. The support arm 68 is operatively installed on the pintle block structure 72, and rotationally locked in a non-adjustable position therein, by inserting lower support arm member end portion 74 into the pintle support block member openings 116,118 in a manner bringing the pintle arm opening 78 into alignment with the pintle block openings 120, and bringing the tapered support arm surface 80 into engagement with the similarly tapered interior surface of the pintle block opening 116. A locking pin 138 is then operatively inserted into the aligned openings 78,120 (the openings 78 being lined with annular bushings 79) to rotationally lock the support arm 68 relative to the pintle block. To further stabilize the support arm portion 74 disposed within the pintle block 72, the collet 130, the spacer member 132 and the lock washer 134 are sequentially placed over the lower end of the support arm, and the nut 136 is tightened onto the threaded lower support arm end 76 to thereby force the tapered collet 130 upwardly into engagement with the tapered interior surface of the lower pintle block opening 118 to thereby rigidly stabilize the lower support arm portion captively retained within the interior of the pintle block 72.

As can be seen, compared to the pintle arm assembly shown in U.S. Pat. No. 6,250,197, the novel pintle arm assembly 52 just described is of a simpler, more cost effective construction, requiring considerably fewer parts while at the same time providing a desirably rigid connection between the support arm 68 and the pintle block structure 72.

Turning now to FIGS. 6–12, the machine gun 58 is representatively a 0.50 caliber machine gun of generally conventional construction and having an elongated body portion (receiver) 140 from a front end 142 of which a barrel 144 forwardly projects. A spaced pair of apertured mounting tabs 146 (one of which being visible in FIG. 9) project downwardly from the bottom side of the machine gun body 140. A specially designed annular trunnion nut 148 is threaded onto a front portion of the gun body 140 and has a circumferentially spaced series of circular mounting openings 150 extending radially therethrough. Openings 150 are nonthreaded and, as illustrated in FIG. 10 are each lined with an annular, nonthreaded, case-hardened steel bushing 152.

Machine gun 58 is removably secured to the underlying shock-absorbing cradle assembly 56 which is substantially similar in construction and operation to the cradle assembly illustrated and described in U.S. Pat. No. 6,250,197 which has been incorporated by reference herein. The receiver 140 is releasably secured to the cradle assembly 56 using a ball lock pin 154 (see FIG. 9) inserted through the receiver flanges 146 and an associated pair of cradle flanges 156 (one of which is visible in FIG. 8).

At the front end of the cradle assembly 56 (see FIG. 8) are a spaced pair of upstanding corner mounting bosses 158 having circular openings 160 extending horizontally therethrough, and smaller diameter circular locking openings 161 extending vertically through the upper ends of the bosses 158 into the interiors of their horizontal openings 160. According to a feature of the present invention, the trunnion nut 148, and thus a front end portion of the machine gun receiver 140, are releasably locked to the underlying cradle assembly 56 by placing the trunnion nut 148 between the bosses 158, in a manner such that a diametrically opposite pair of the nut openings 150 are aligned with the boss openings 160, and utilizing a pair of specially designed locking studs 162.

Each mounting stud 162, as best illustrated in FIG. 8, has a tubular body 164 sized to be complementarily and slidably received in one of the boss openings 160, a reduced diameter, nonthreaded cylindrical inner end portion 166 sized to be complementarily and slidably received in one of the trunnion nut openings 150, a transverse circular locking opening 168 extending transversely through an outer end portion of the body 164, and a small peripheral gripping projection 170 on the outer end of the body 164 which facilitates the manual installation and removal of the stud 162.

With the trunnion nut 148 positioned between the bosses 158 as shown in FIG. 8, the studs 162 are inserted inwardly through the boss openings 160 to insert the inner stud end portions 166 in the trunnion nut openings 150 facing the boss openings 160, and to bring the stud locking openings 168 into alignment with the upper boss end openings 161. The inserted studs 162 are then releasably retained in these trunnion nut-locking orientations by inserting ball lock pins 172 downwardly through the aligned stud and boss opening pairs 168,161. This releasably locks a front end portion of the machine gun receiver portion 140 to the underlying cradle structure 56 without the necessity of any threaded connection between the trunnion nut 148 and the associated cradle locking structure.

The yoke assembly 54 (see FIG. 12) is similar to the yoke assembly illustrated and described in U.S. Pat. No. 6,250,197, underlies the cradle assembly 56, and has upwardly projecting pairs of clevis plates 174 which straddle and are pivotally pinned to corresponding clevis structures 176 on the cradle assembly 56 to thereby permit the cradle assembly 56 (and thus the machine gun 58 supported thereon) to elevationally pivot about a horizontal axis 178 relative to the yoke structure 54.

With reference now to FIGS. 11 and 12, the yoke assembly has a bottom center block structure 180 having a bottom side opening (not visible) that upwardly and rotatable receives the tubular upper end portion 96 (see FIG. 11) of the mounting stud 86, the upper end portion 96 being captively retained in the center block 180 by means of a retaining pin 182 extended through the center block 180 and received in a peripheral portion of the exterior annular groove 98 formed in the upper mounting stud end portion 96.

This rotational connection between the yoke assembly 54 and the pintle arm assembly 52 permits the machine gun 58 to pivot relative to the stationary pintle arm assembly 52 about a generally vertical azimuth axis 184 in addition to being pivotable relative to the stationary pintle arm assembly about the horizontal elevational axis 178. As illustrated in FIG. 1, the azimuth axis 184 is forwardly inclined relative to a vertical reference axis 186 by a small angle A which is representatively equal to the forward rotor axis tilt—i.e., approximately three degrees.

In this manner, with the machine gun 58 in its upper limit position and the helicopter in a level orientation, the elevational angle of the machine gun's firing axis is automatically increased as the machine gun 58 is rearwardly pivoted about the forwardly inclined vertical axis 184, and is automatically decreased as the machine gun is forwardly pivoted about the axis 184. This advantageously increases the gun's side and rear firing ranges, while at the same time maintaining a safe vertical clearance distance between the gun's firing axis and the drooped front end of the helicopter's rotor blade tip envelope when the gun is in its forwardmost azimuth orientation. The total available azimuth rotation arc of the machine 58 is set by the previously mentioned stop projections 94 (see FIG. 11) on the azimuth plate 92. A stop projection 188 (see FIG. 4) on the underside of the center block structure 180 engages and is stopped by the azimuth plate projections 94 at the opposite azimuth rotational limit positions of the machine gun.

With both the machine gun 58 and its associated ammunition box/booster assembly 60, together with the balance of the armament apparatus 50, disposed externally of the cabin area (see FIG. 1), the gunner's windows 26 can be closed during inclement weather during periods when the gun is not being fired, the cabin area is not cluttered with armament apparatus, and the use of larger machine guns, such as the illustrated 0.50 caliber machine gun 58, is substantially facilitated. The pintle arm assembly 52 has a rugged construction which has only minimal vertical and horizontal "play" therein, thereby substantially increasing the firing accuracy of the gun.

A portion of an alternate embodiment 190 of the previously described pintle arm assembly 52 is illustrated in FIGS. 16 and 17. The pintle arm assembly 190 is identical to the pintle arm assembly 52 with the exceptions that (1) the support arm member 68 has a uniform cross-section along its length and is provided with two sets of diametrically opposed openings 192 in a lower end portion thereof, and (2) the pintle support block 72 has spaced pairs of aligned openings 194 on opposite sides thereof inboard of the mounting flanges 122,124. The support arm 68 is operatively installed in the pintle support block 72 by inserting a lower end portion of the support arm 68 into the interior of the pintle support block 72 in a manner aligning the support arm openings 192 with the pintle block openings 194, and then inserting two expansion pins 196 through the aligned opening sets 194,192 to rotationally and translationally lock the inserted support arm lower end portion within the interior of the pintle support block 72.

Turning now to FIGS. 6, 7 and 18–20, the ammunition box/booster assembly 60 includes a generally rectangular ammunition box 200 (see FIGS. 18–20) having an outlet opening 202, a booster housing 204 having an access opening 206 and a discharge opening 207, and a specially designed electric booster motor 208 having external rotatable drive sprockets 210 and 211, the motor 208 being mounted in a subsequently described unique manner within the booster housing 204 between its access opening 206 and its discharge opening 207.

The booster housing 204 is removably secured to the ammunition box 200 with the booster housing access opening 206 aligned with the ammunition box outlet opening 202, and the booster housing discharge opening 207 facing downwardly. As illustrated in FIGS. 6 and 7, a bottom side portion of the ammunition box 200 is suitably secured to spaced apart mounting structures 212,214 anchored to the top side edge portion 46d of the tow plate 46. This positions the ammunition box/booster assembly inboard of the pintle support arm 68 and the machine gun 58, with the booster housing 204 facing rearwardly. Ammunition box 200 holds a length of belted ammunition 216 which is engaged and driven outwardly through the booster housing discharge opening 207 by the rotationally driven sprockets 210 and 211, and routed to the machine gun 58, during firing of the gun.

Figure 19:
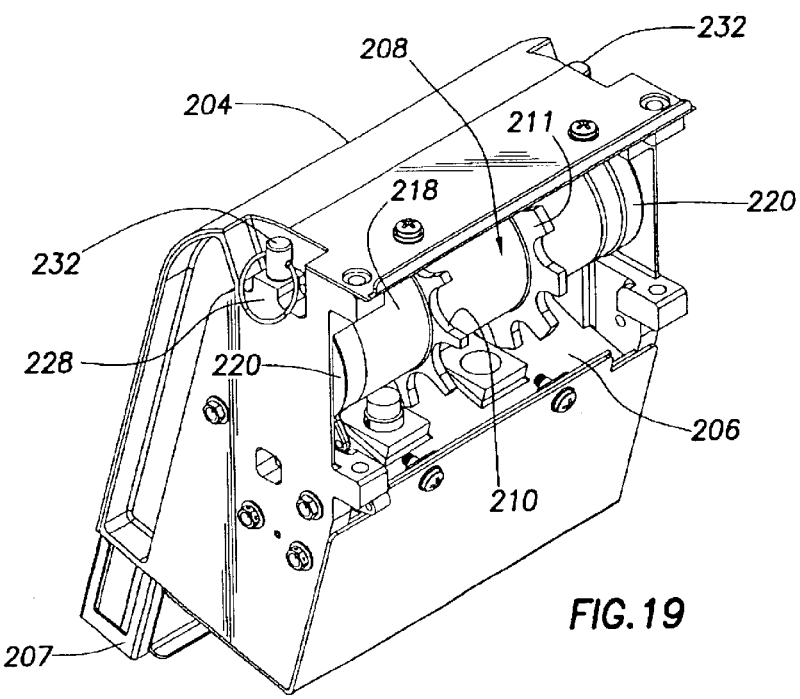
FIG. 19 is an enlarged scale inner side perspective view of the booster portion of the FIG. 18 ammunition box/booster assembly.

According to a feature of the present invention, the booster motor 208 is specially designed to permit it to be rapidly installed within or removed from the booster housing 204 without the use of tools of any sort. As illustrated in FIGS. 19 and 20, the booster motor 208 has a cylindrical body 218 on which the sprockets 210,211 are coaxially and rotatably carried, and,generally annular mounting members 220 secured to the opposite ends of the body 218. Aligned, diametrically opposite grooves 222 are formed in each of the annular mounting members 220 as may be best seen in FIG. 20.

Disposed within the booster housing 204, inwardly adjacent opposite ends of the access opening 206, are a spaced pair of mounting bosses 224 (only one of which is visible), each of the bosses 224 having an upper end opening 226 formed therein. Bosses 224 underlie a pair of exterior mounting bosses 228, with the openings 226 in the interior bosses 224 being aligned with vertical through-holes 230 in the exterior bosses 228. To rapidly install the booster motor 208 within the booster housing 204 without using any tool, the motor 208 is simply inserted inwardly through the booster housing access opening 206 in a manner placing the motor end grooves 222 in alignment with the opposing boss opening pairs 226,230. Ball detent locking pins 232 are then downwardly inserted sequentially through the exterior boss openings 230, the motor end grooves 222 and into the interior openings 226, thereby captively retaining the booster motor 208 within the booster housing 204.

The booster housing 204 is then secured to the ammunition box 200 over its outlet opening 202. To subsequently remove the booster motor 208, for replacement with another booster motor 208, the booster housing 204 is simply removed from the ammunition box 200, the pins 232 are pulled out, the booster motor 208 is removed, and another booster motor is installed within the booster housing 204 as previously described. The booster housing 204 is then re-attached to the ammunition box.

Figure 4:
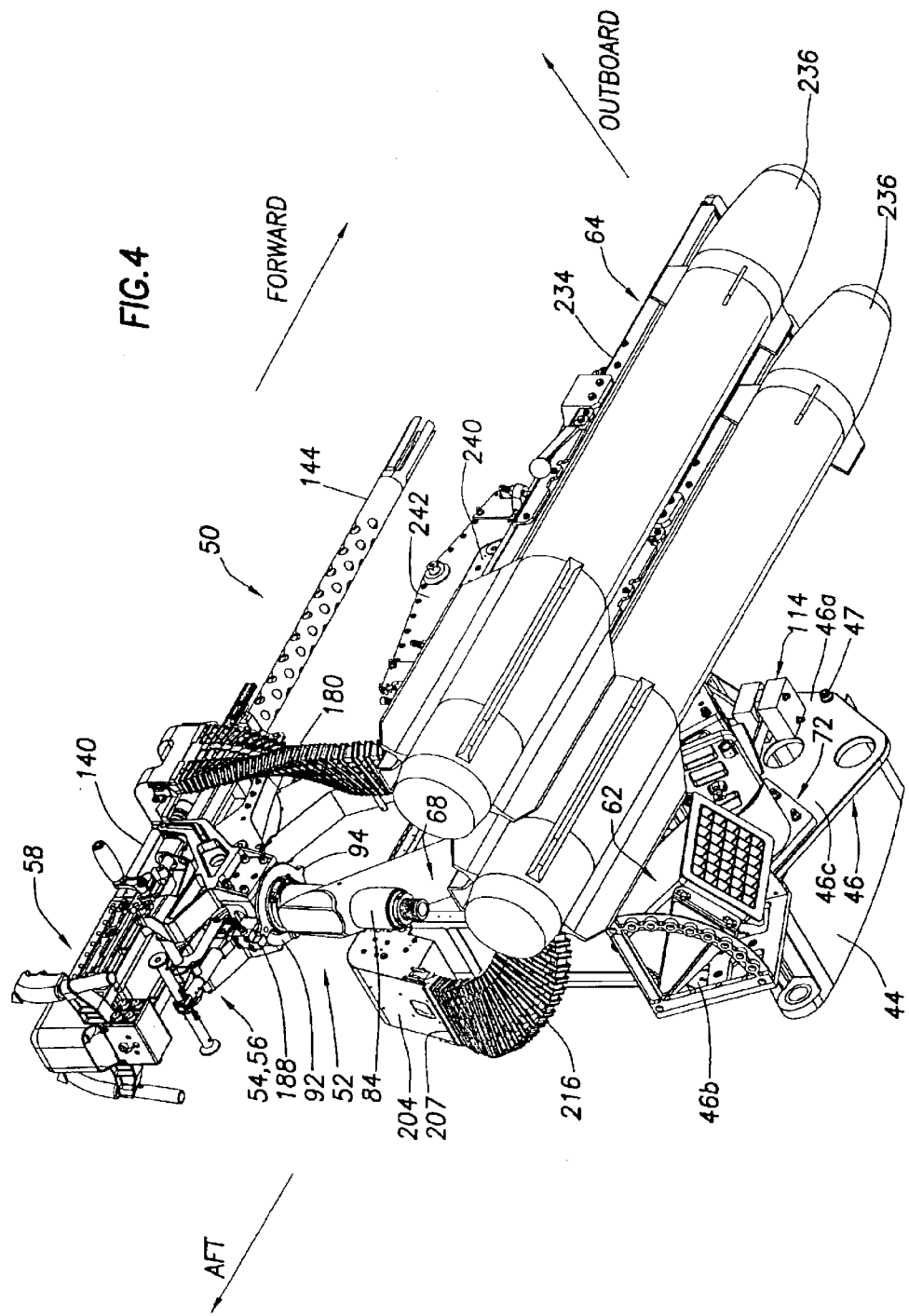
FIG. 4 is a rear outboard bottom perspective view of the armament apparatus.
Figure 5:
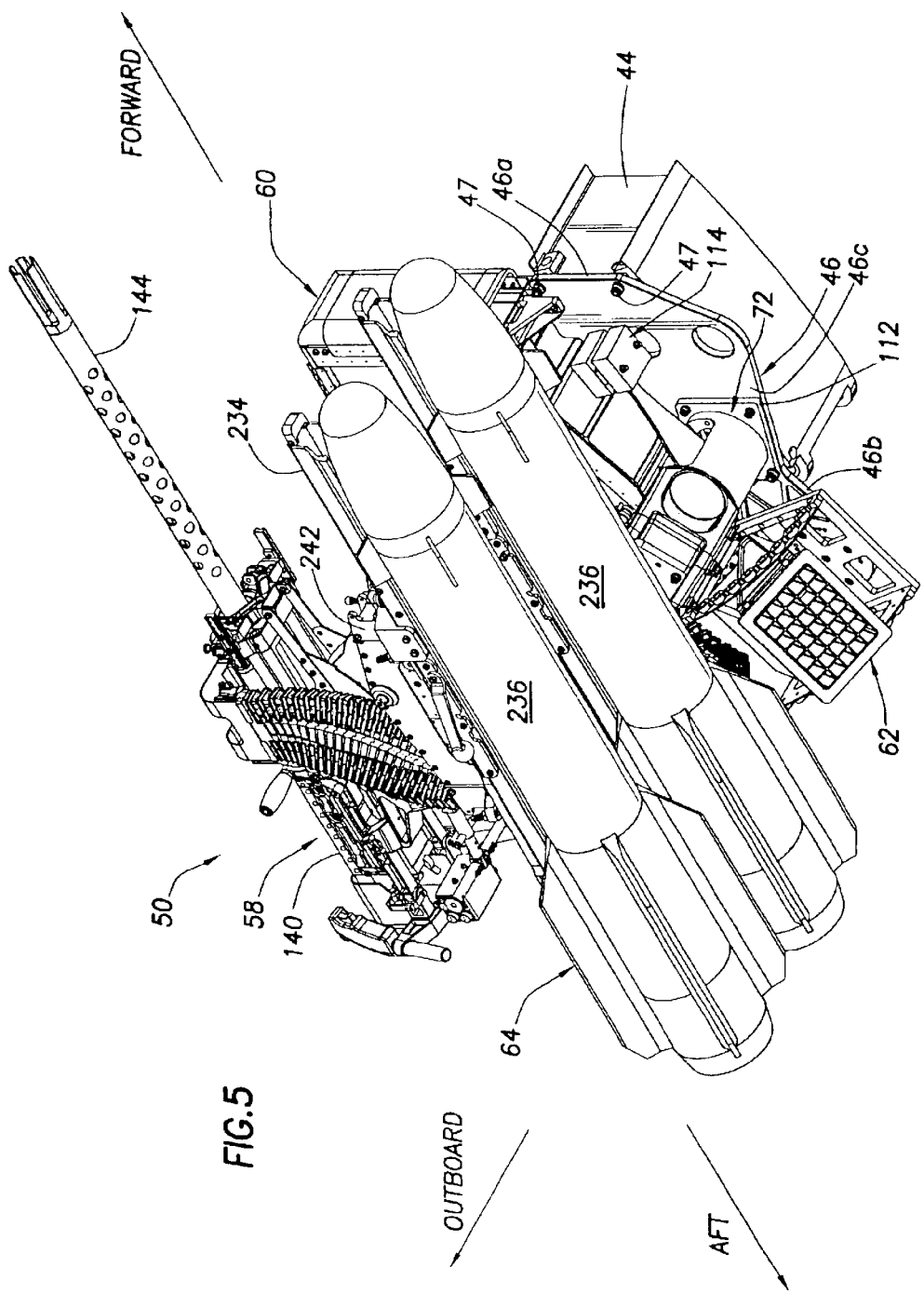
FIG. 5 is a front outboard bottom perspective view of the armament apparatus.

Referring now to FIGS. 1, 4 and 5, as previously mentioned the flare dispenser 62 is mounted on the specially configured rear end portion 46b of the tow plate 46. This places the installed flare dispenser 62 generally beneath the pivotal mounting location of the machine gun 58 and accordingly eliminates any potential interference between the gun barrel 144 and the flare dispenser 62 as the gun is being swung through its azimuth arc in a depressed orientation.

Turning now to FIGS. 2, 3, 6 and 21–23, the missile launcher assembly 64, which is positioned outboard of the pintle support assembly 52, is of a generally conventional construction and may be generally referred to as an external stores apparatus. AS used herein, the term "external stores" encompasses armament apparatus, such as missiles, rockets and rocket launchers, additional guns, electronics, etc. which are carried externally to the aircraft and are typically, though not necessarily, jettisonable (via, for example, a bomb rack or the like).

Representatively, the missile launcher assembly 64 includes a missile support frame 234 (see FIG. 2) that carries two forwardly directed missiles 236 which underlie the support frame 234. An upper side portion of the support frame 234 is connected to hook portions 238 (see FIG. 23) on the underside of a conventional bomb rack 240 overlying the support frame 234. The bomb rack 240 is carried within a housing 242 which, together with the bomb rack 240, forms a portion of a specially designed external stores support structure 244 (see FIG. 21) that, in a subsequently described manner, supports the missile launcher assembly 64 (or other external stores apparatus as the case may be) on the pintle support block 72, and thus on the tow plate 46.

Figure 21:
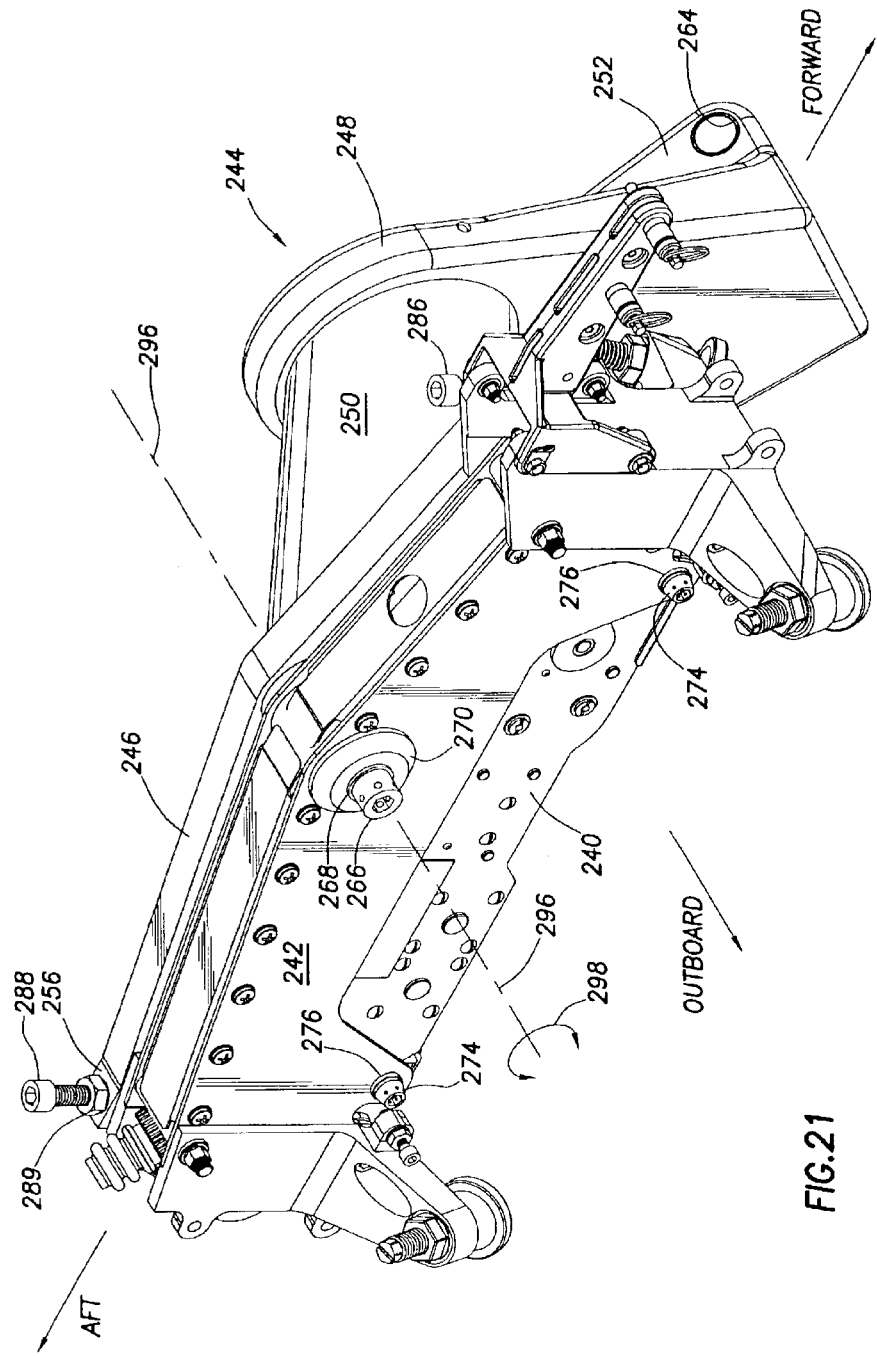
FIG. 21 is a perspective view of an external stores support structure portion of the armament apparatus.
Figure 22:
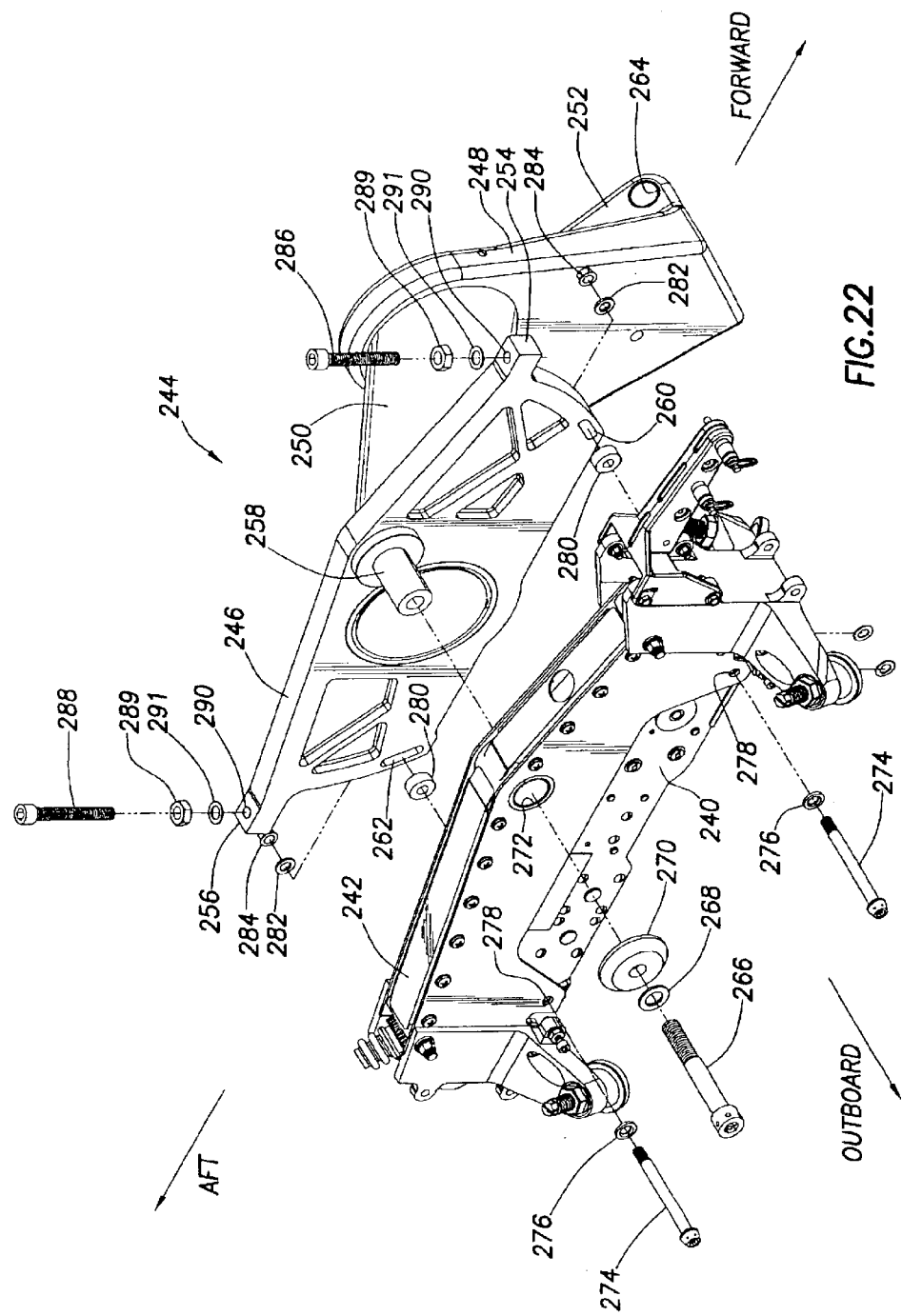
FIG. 22 is a partially exploded perspective view of the external stores support structure of FIG. 21.

As best illustrated in FIGS. 21–23, the external stores support structure 244 includes a perforated outboard face plate 246, an inboard base plate 248 secured to the face plate 246 by a support tube 250 sloped downwardly in an inboard direction, and a mounting lug 252 projecting outwardly from a lower inboard side portion of the base plate 248.

With reference now to FIG. 22, the face plate 246 is elongated in a front-to-rear direction and has outwardly projecting front and rear adjustment ears 254,256 on opposite ends thereof, an internally threaded tubular pivot support post 258 projecting outwardly from an upper central portion of the outboard side of the face plate 246, and arcuate front and rear adjustment slots 260,262 extending through the plate 246 on lower front and rear portions thereof. Mounting lug 252 (see FIG. 6 also) has spaced apart mounting openings 264 extending therethrough.

The housing structure 242 is secured to the balance of the external stores support structure 244 in the following manner. A socket head bolt 266 is sequentially passed through a flat washer 268, a spindle washer 270 and a bushed circular opening 272 extending through the housing structure 242, and is threaded into the pivot support post 258. Additionally, bolts 274 are sequentially passed through washers 276, housing holes 278, the bomb rack 240, annular sway brace spacers 280, and the arcuate face plate slots 260 and 262, with flat washers 282 and nuts 284 being secured to the inner ends of the bolts 274 on the inboard side of the face plate 246.

Front and rear elevation bolts 286,288 are extended through lock nuts 289 and washers 291 and threaded downwardly through threaded openings 290 in the face plate adjustment ears 254 and 256, with the lower ends of the bolts 286,288 overlying and engaging outwardly projecting lugs 292 on front and rear inboard side portions of the housing 242 (see FIG. 23). The external stores support structure 244 is removably anchored to the pintle support block 72, as schematically shown in phantom in FIG. 6, by placing the base plate lug 252 between the pintle block flanges 122,124 in a manner aligning the lug holes 264 with the flange holes 126,128 and then extending schematically depicted expansion pins 294 through the aligned holes in the lug 292 and flanges 122,124.

The mounting of the bomb rack housing 242 to the support structure face plate 246 in the manner described above permits the housing 242, and thus the supported missiles 236 (or other external stores apparatus as the case may be) to be elevationally adjusted about a horizontal inboard-outboard axis 296 (as indicated by the double-ended arrow 298 in FIG. 21) extending longitudinally through the pivot support post 258. Such elevational adjustment is effected by (1) loosening the nuts 284 (see FIG. 22) to permit the bolts 274 to move through the arcuate face plate slots 260 and 262, (2) loosening the lock nuts 284 and upwardly retracting one of the elevation bolts 286,288 and downwardly advancing the other elevation bolt to pivotally adjust the bomb rack frame 246 about the elevation axis 196, and then (3) retightening the nuts 284,294 to lock the missiles 236 in their elevationally adjusted positions. A similar adjustment structure could be provided to permit the housing 242 to be selectively adjusted about a vertical axis as well.

Figure 24:
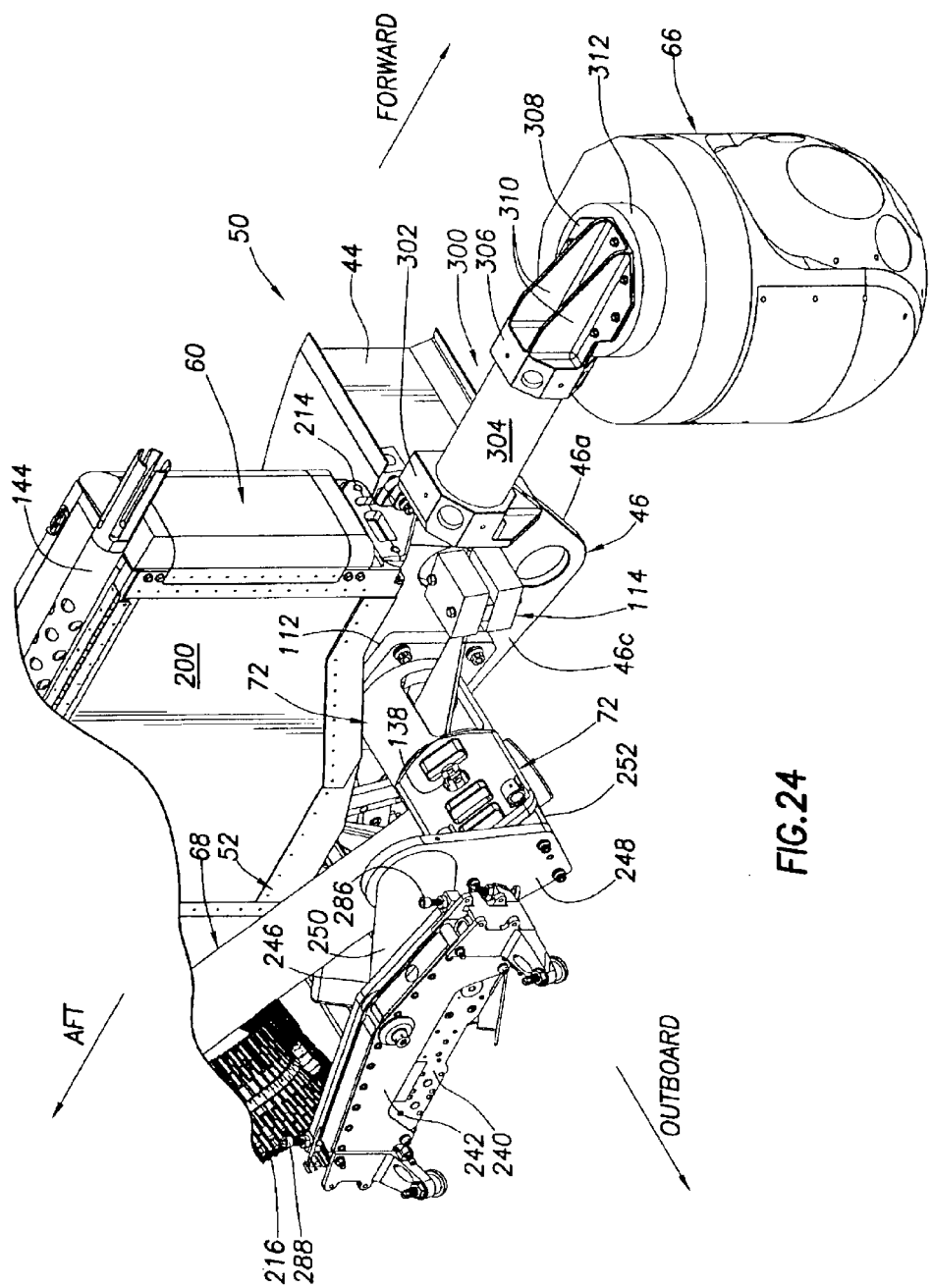
FIG. 24 is a front outboard perspective view of the armament apparatus, with a representative missile launcher portion removed therefrom, and a forward looking infrared (FLIR) sensor secured to a front edge portion of the sponson tow plate.

Turning now to FIG. 24, in addition to the previously described components thereof the external armament apparatus 50 (in the absence of the refueling boom 49) may also include the conventional forward-looking infrared sensor (FLIR) 66 which is supported on the front edge portion 46a of the tow plate 46 by a specially designed mounting structure 300 positioning the sensor 66 forwardly of the tow plate 46. The mounting structure 300 includes a first mounting block 302 bolted to the front edge portion 46a of the tow plate 46, a support tube 304 longitudinally projecting forwardly from the mounting block 302, and a second mounting block 306 secured to the forward end of the support tube 304. A horizontally disposed flange 308 is secured to the front side of the mounting block 308 by vertical webs 310 and is bolted to a top end portion 312 of the sensor 66. As opposed to its normal mounting position on a front underside portion of the helicopter 10, this unique sponson mounting of the sensor 66 provides several advantages including enhanced front end ground clearance and improved aircraft weight and balance/center of gravity.

Referring now to FIG. 12, a spaced pair of parallel, facing elevation limiting plates 314 (only one of which is visible in FIG. 12) project downwardly from front bottom side portions of the cradle assembly 56. Each plate 314 has an arcuate bottom edge 316 in which upper and lower notches 318,320 are formed. With the missile launcher assembly 64 (see FIG. 2) removed, and the previously described gun mounting stud 86 (see FIGS. 11 and 13) installed, the cradle assembly 56 (and thus the machine gun 58) may be pivoted forwardly and downwardly through an elevation arc of approximately 50 degrees before the upper plate notches 318 engage the yoke assembly center block 180 and prevent further downward pivoting of the machine gun 58. Upward pivoting of the machine gun 58 is limited to a generally horizontal position by the downward receipt of outer ends of a latch bar member 322 in slots 324 in latch members 326 on the underlying yoke assembly 54 as illustrated and described in U.S. Pat. No. 6,250,197.

Figure 25:
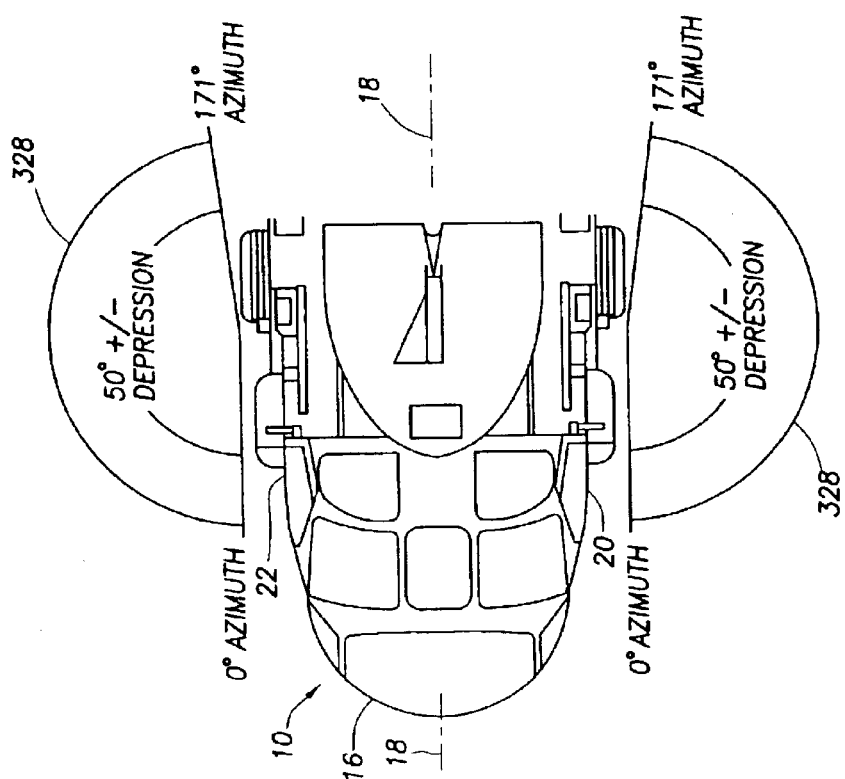
FIGS. 25 and 26, respectively, are simplified top plan and front elevational views of the helicopter, with the armament apparatus removed therefrom, diagrammatically illustrating the machine gun elevation and azimuth rotational limits which may be provided in the armament apparatus with the missile launcher structure removed therefrom.

As previously described, the stop projections 94 on the azimuth stop plate portion of the mounting stud 86 limit the azimuth rotation of the yoke assembly 54, and thus the machine gun 58, to a predetermined arc. As diagrammatically depicted in FIGS. 25 and 26, with the missile launcher assembly 64 removed and the mounting stud 86 installed, the azimuth arc 328 is representatively about 171 degrees from the forward limit of the gun 58 to the rearward limit of the gun 58, with a full depression arc 330 of about 50 degrees being available throughout the full azimuth arc 328.

According to a feature of the present invention, with the missile launcher assembly 64 installed a specially designed elevation limiting system, subsequently described herein, is provided and functions in a unique manner to automatically alter the available gun depression arc, in response to azimuth rotation of the gun, to prevent potential interference between the gun's bullet path and a front end portion of the installed missile launcher assembly 64. AS diagrammatically shown in FIGS. 27 and 28, with this elevation limiting system installed, a total available gun travel azimuth arc 328 of approximately 164 degrees is provided as shown, in FIG. 27. However, the full available 50 degree depression arc 330 (see FIGS. 27 and 28) is permitted only in a rear portion 328a of the azimuth arc 328. In an approximately 64 degree front portion 328b of the available azimuth arc 328, only a limited depression arc 330a of approximately 18 degrees (see FIG. 28) is permitted by the elevation limiting system, generally denoted by the reference numeral 332, which will now be described in conjunction with FIGS. 29–32.

Figure 27:
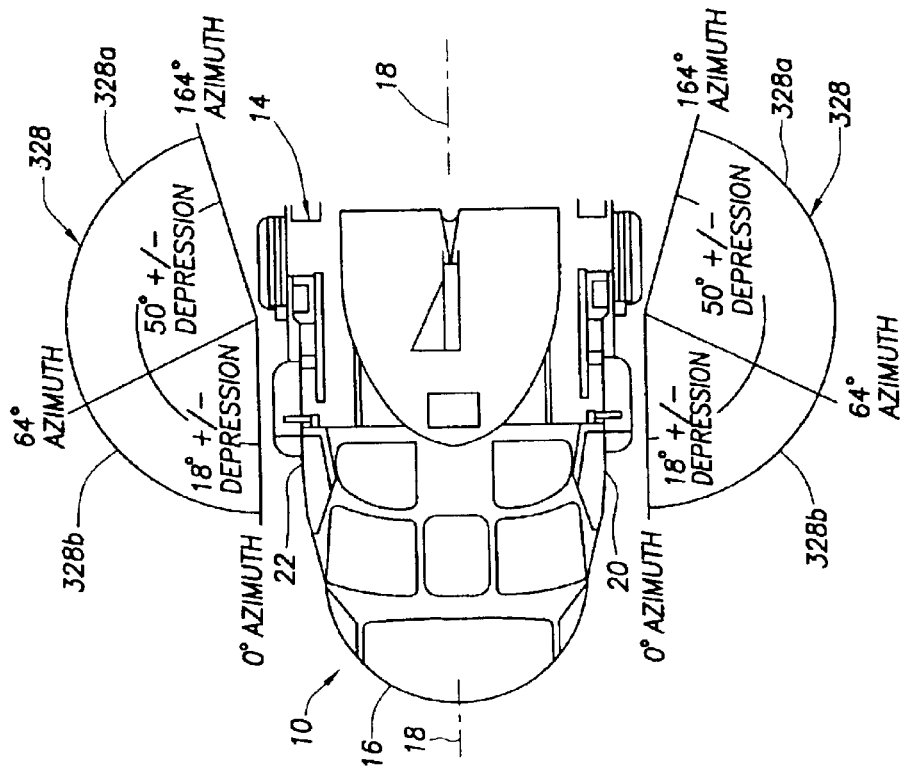
FIGS. 27 and 28, respectively, are views similar to those in FIGS. 25 and 26 and diagrammatically illustrate the machine elevation and azimuth rotational limits provided, when the missile launcher structure is included in the overall armament apparatus, by a specially designed elevation limiting structure incorporated in the armament apparatus.
Figure 28:
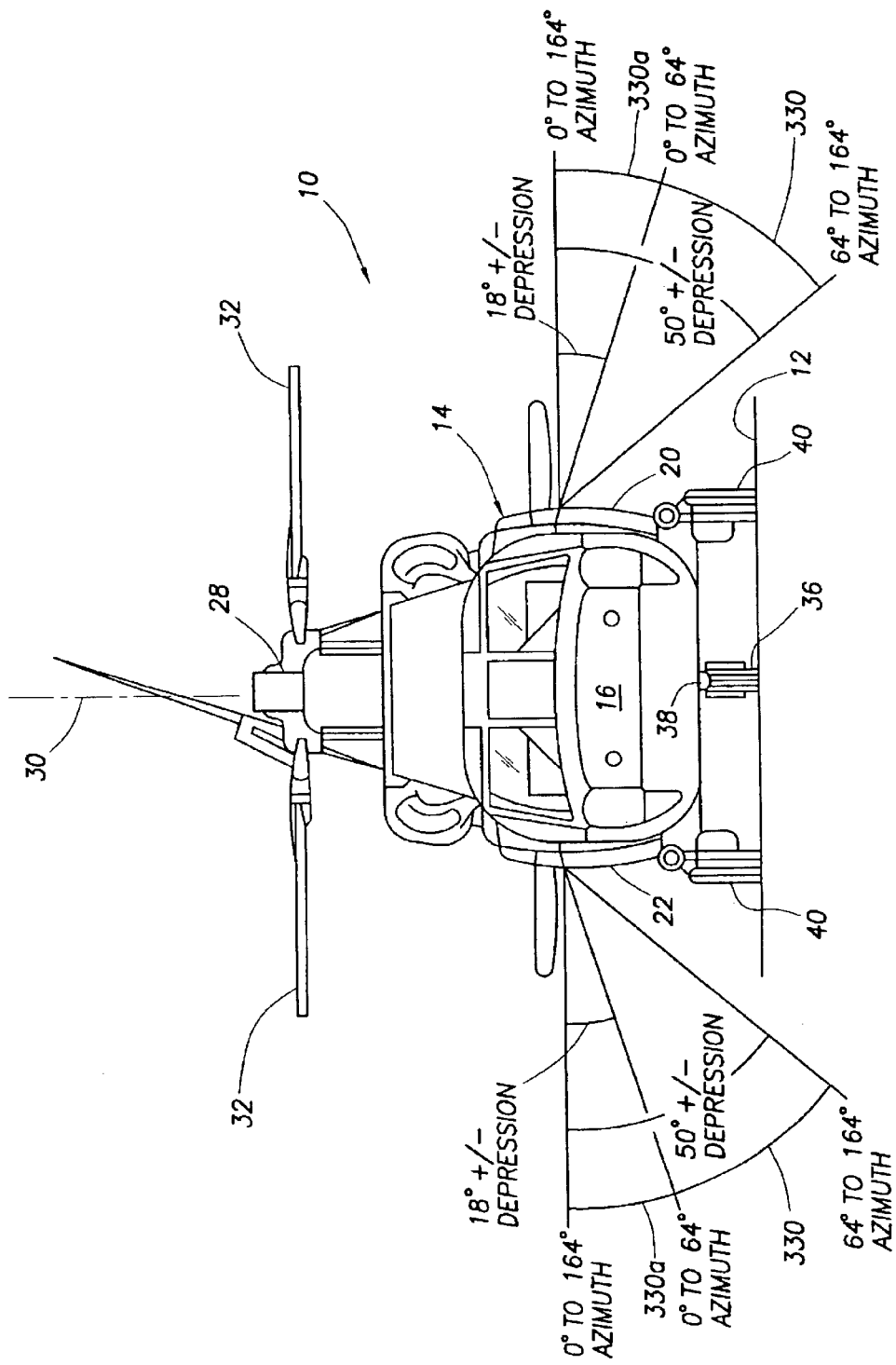
Figure 29:
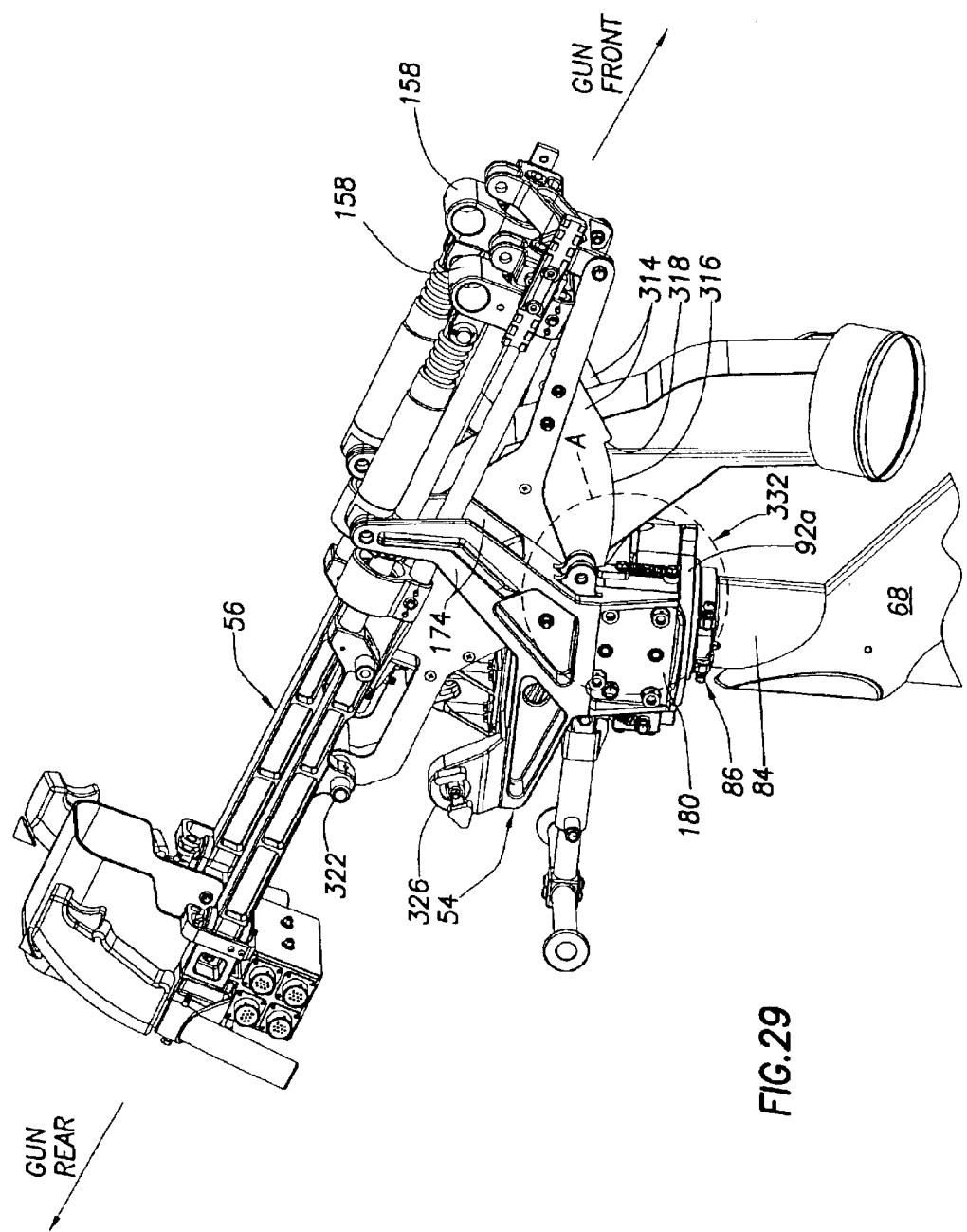
FIG. 29 is an outboard side perspective view of a machine gun mounting portion of the armament apparatus illustrating the operation of a specially designed gun elevation limiting system embodying principles of the present invention, a gun support cradle assembly portion of the gun mounting portion being in a forwardly pivoted, depressed orientation.

In FIG. 29 the cradle assembly 56 has been forwardly rotated to be within the front portion 328b of the available azimuth arc 328 shown in FIG. 27, is downwardly pivoted to its depression limit position within such azimuth range of approximately 18 degrees, and is being precluded by the elevation limiting system 332 from being further pivoted in a downward direction.

Figure 30:
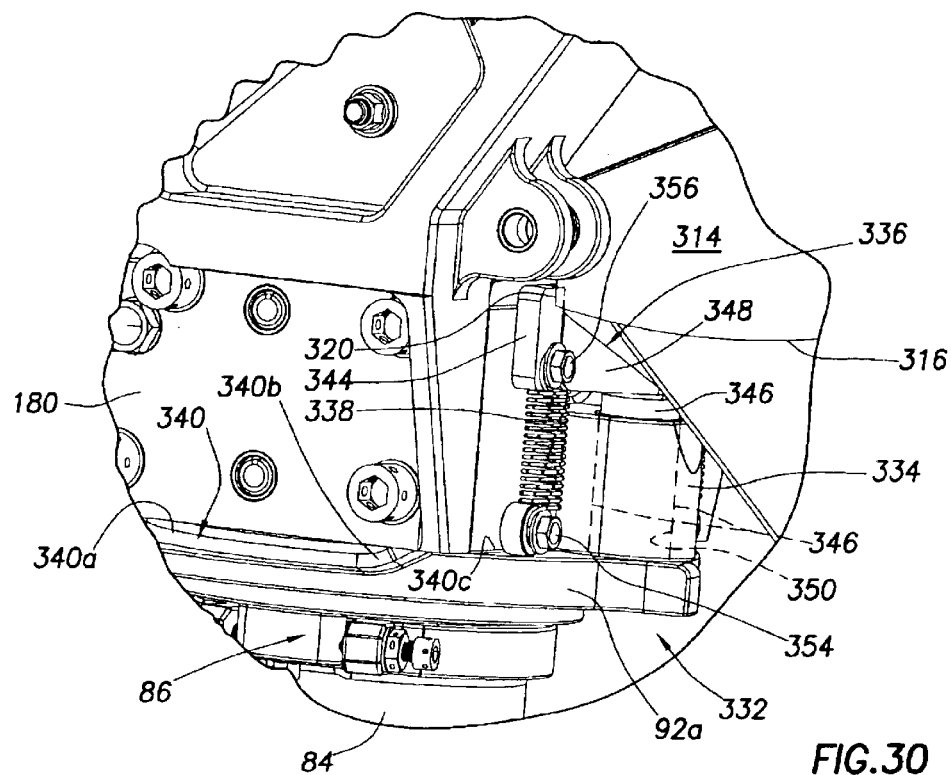
FIG. 30 is an enlarged scale detail view of the dashed circle area "A" in FIG. 29.

Turning now to FIG. 30, the elevation limiting system 332 includes a modified azimuth stop plate 92a incorporated in the mounting stud 86, the previously mentioned elevation limiting plates 314, a boss member 334 anchored to the yoke assembly center block 180 and overlying a top side peripheral portion of the azimuth stop plate 92a, a vertically movable cam follower member 336, and a vertically disposed coiled tension spring 338.

The stationary azimuth plate 92a has, on a peripheral top side portion thereof, an arcuate track 340 with a lower arcuate portion 340a corresponding to the rear azimuth arc portion 328a (see FIG. 27), and an upwardly ramped area 340b connecting the lower arcuate track portion 340a with an elevated arcuate track portion 340c corresponding to the forward azimuth arc portion 328b (see FIG. 27).

Follower member 336, as shown in FIG. 30, has an upwardly projecting stop portion 344 joined to a horizontally offset cylindrical guide portion 346 by a tapered intermediate portion 348. The cylindrical guide portion 346 is slidingly received in a circular bore 350 extending vertically through the boss 334. The lower end of the guide portion 346 has a cam roller 352 secured thereto (see FIG. 32) which is rollable along the track 340 as the yoke assembly 54 is rotated relative to the stationary azimuth plate 92a. The lower end of the spring 338 is anchored, as at 354, to the center block 180, and the upper end of the spring 338 is anchored, as at 356, to the follower member stop portion 344 for vertical movement therewith relative to the center block 180. Spring 338 resiliently biases the follower member 336 downwardly toward the stationary azimuth stop plate 92*a*.

With the cradle assembly in its FIG. 29 orientation, the follower wheel 352 (see FIG. 32) is on the upper portion 340*c* of the azimuth plate track 340, and the follower member stop portion 344 is in a raised position in which acts as an abutment for the lower limiting plate notches 320, thereby blocking further downward pivoting of the cradle assembly 56 (and thus the gun 58) past an 18 degree depression angle when the gun 58 is in the 0–64 degree azimuth arc 328*b* shown in FIG. 27.

Figure 32:
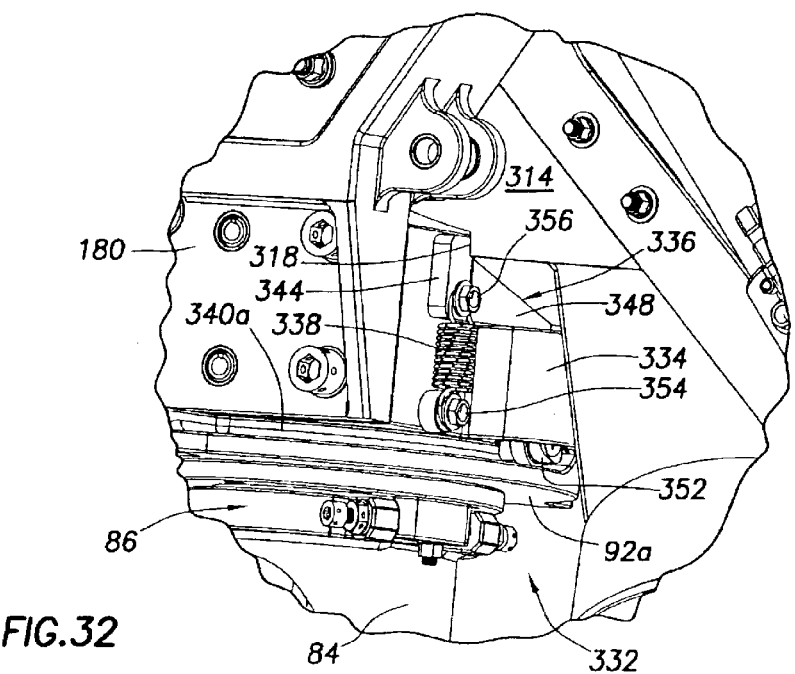
FIG. 32 is an enlarged scale detail view of the dashed circle area "B" in FIG. 31.
Figure 31:
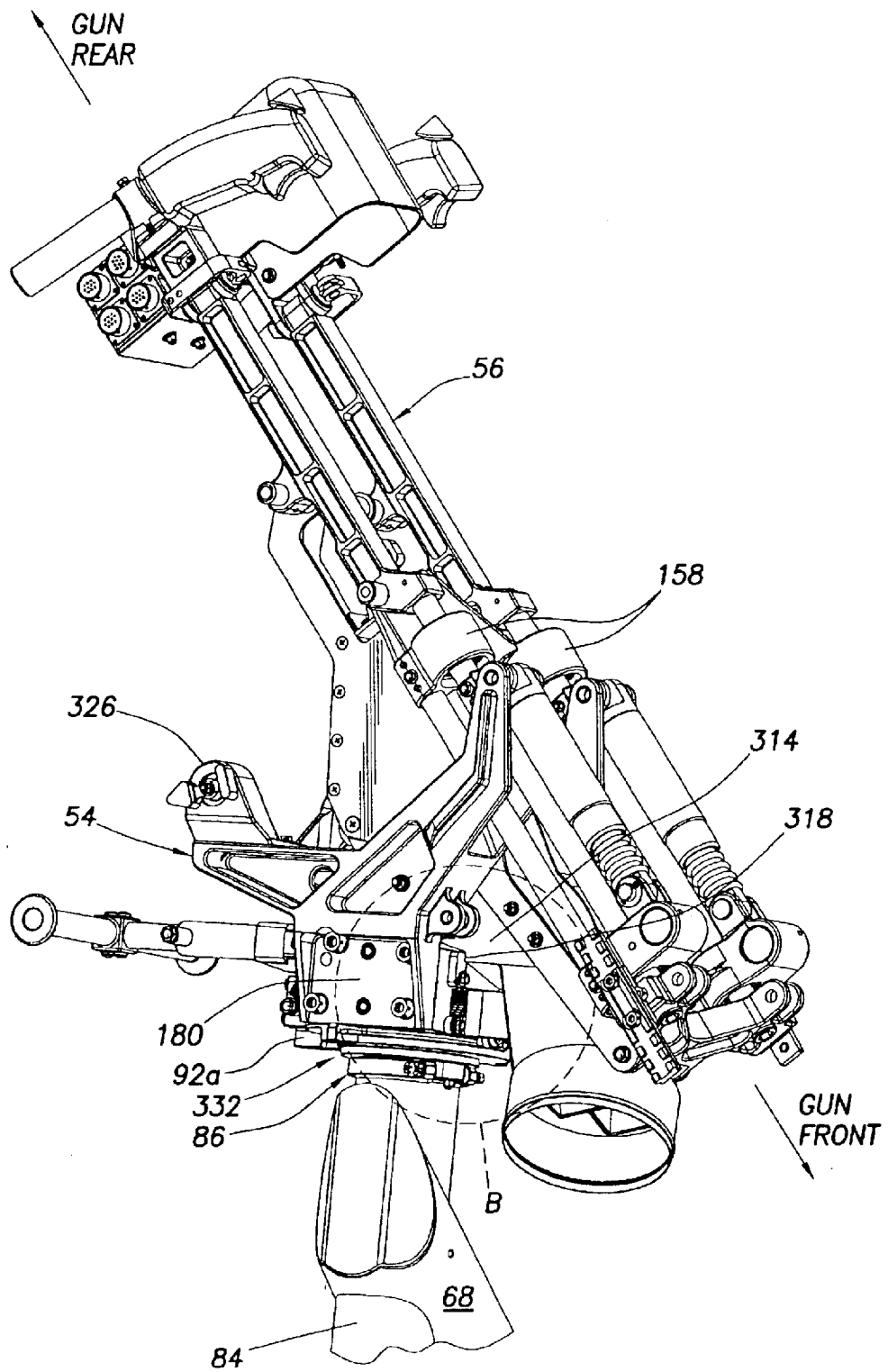
FIG. 31 is a rear side perspective view of the machine gun mounting portion shown in FIG. 29, with the cradle assembly being in a rearwardly pivoted, depressed orientation.

In FIGS. 31 and 32, the cradle assembly 56 is horizontally pivoted rearwardly to within the 64–164 degree azimuth portion 328*a* shown in FIG. 27, and is downwardly pivoted to its full depression angle of approximately 50 degrees. In this cradle/gun orientation, the follower wheel 352 is engaged with the lower track portion 34*a* (see FIG. 32), thereby lowering the follower member stop portion 318 relative to its FIG. 30 position. In turn, this lowered position of the stop portion 318 permits the cradle assembly 56 (and thus the gun 58) to be lowered past its FIG. 29 depression angle to its fully depressed (50 degree down) orientation at which point the upper plate notches 318 engage the follower member stop portion 344 to prevent further downward pivoting of the gun 58 while it is in its 64–164 degree azimuth arc portion 328*a* shown in FIG. 27.

In the event that the gun 58 is pivoted forwardly from the azimuth arc portion 328*a* shown in FIG. 27 while in a depression angle greater than 18 degrees, the forcible engagement of the follower wheel 352 with the track ramp 340*b* prevents the gun from being forwardly swung into the forward azimuth arc portion 238*b* shown in FIG. 27 unless the gun 58 is raised to an elevation angle of less than 18 degrees. It can thus be seen that the elevation limiting system functions to automatically alter the available gun depression angle in response to azimuth rotation of the gun 58. Representatively, this automatic alteration of the available gun depression angle provides two different depression angle ranges corresponding to two different azimuth rotation arc portions. However, it should be readily appreciated that more than two different depression angle ranges could be built into the elevation limiting system 332 if desired.

As will be readily appreciated by those of skill in this particular art, a variety of modifications could be made to the representatively illustrated external armament apparatus 50 without departing from principles of the present invention. For example, but not by way of limitation, machine guns of types other than the representatively illustrated 0.50 caliber machine gun 58 (for example 7.62 mm mini-guns or 7.62 mm single barrel machine guns) could be utilized, the armament apparatus could be mounted on aircraft (such as fixed wing aircraft) other than helicopters, and various ones of the previously described components could be selectively left out of the overall armament combination described above. As examples, the missile launcher could at least be temporarily omitted from the overall armament package, the machine gun and ammo box combination could be the total weaponry compliment, the FLIR sensor could be omitted, or other armament component combinations could be utilized.

The foregoing detailed description is to be clearly understood as being given by way of illustration and example only, the spirit and scope of the present invention being limited solely by the appended claims.

What is claimed is:

1. Armament apparatus for a helicopter comprising:

a helicopter landing gear structure; and an infrared sensor secured directly to said landing gear structure by a mounting structure.

2. The armament apparatus of claim 1 wherein:

said infrared sensor is a forward-looking infrared sensor.

3. The armament apparatus of claim 1 wherein:

said infrared sensor is disposed forwardly of said landing gear structure.

4. The armament apparatus of claim 3 wherein:

said infrared sensor is secured directly to said landing gear structure by mounting structure extending forwardly from said landing gear structure.

5. Armament apparatus for a helicopter comprising:

a helicopter landing gear sponson structure having a tow plate with a front portion, a rear portion, and a central portion disposed between said front and rear portions; and a forward-looking infrared sensor secured to said front portion of said tow plate.

6. The armament apparatus of claim 5 wherein:

the infrared sensor is disposed forwardly of said front portion of said tow plate.

7. The armament apparatus of claim 5 wherein:

said infrared sensor has an upper end portion, and said infrared sensor is secured to said front tow plate portion by a mounting structure having a first mounting portion anchored to said front tow plate portion, an elongated support member longitudinally extending forwardly from said first mounting portion and having a forward end, and a second mounting portion secured to said forward end and to said upper end of said infrared sensor.

8. Armament apparatus for a helicopter comprising:

a landing gear structure; and an infrared sensor secured to said landing gear structure, said landing gear structure being a helicopter landing gear sponson structure having a tow plate portion, and said infrared sensor being secured directly to said tow plate portion.

9. The armament apparatus of claim 8 wherein:

said infrared sensor is disposed forwardly of said tow plate portion.

10. The armament apparatus of claim 8 wherein:

said infrared sensor is a forward-looking infrared sensor.

11. Armament apparatus for an aircraft comprising:

a helicopter landing gear sponson structure having a tow plate portion;

a mounting structure having a first portion anchored to said tow plate portion, and a second portion disposed outwardly of said tow plate portion; and an infrared sensor secured to said second portion of said mounting structure.

12. The armament apparatus of claim 11 wherein:

said second portion of said mounting structure is disposed forwardly of said tow plate portion.

13. The armament apparatus of claim 12 wherein:

said infrared sensor is a forward looking infrared sensor.

* * * * *